United States Patent [19]

Weber et al.

[11] Patent Number: 4,598,105

[45] Date of Patent: Jul. 1, 1986

[54] RUBBER COMPOSITION AND METHOD

[75] Inventors: Kenneth E. Weber, Pacific Palisades, Calif.; Dirk Oberlin, Autora, Colo.

[73] Assignee: Amoco Corporation, Chicago, Ill.

[21] Appl. No.: 651,615

[22] Filed: Sep. 17, 1984

Related U.S. Application Data

[63] Continuation-in-part of Ser. No. 534,347, Sep. 21, 1983, abandoned, which is a continuation of Ser. No. 398,995, Jul. 16, 1982, abandoned.

[51] Int. Cl.[4] .......................... C08K 3/04; C08K 3/28; C08K 5/17; C08K 9/04
[52] U.S. Cl. .................... 523/215; 523/200; 523/216; 523/220; 523/333; 523/334; 524/63; 524/65; 524/86; 524/87; 524/88; 524/89; 524/90; 524/93; 524/94; 524/96; 524/97; 524/99; 524/100; 524/102; 524/104; 524/105; 524/236; 524/451; 524/571; 524/575
[58] Field of Search ............... 523/215, 216, 220, 333, 523/334; 524/63, 65, 86–90, 93–94, 96–97, 99–100, 102, 104–106, 571, 575

[56] References Cited

U.S. PATENT DOCUMENTS

| | | | |
|---|---|---|---|
| 2,531,396 | 11/1950 | Carter | 524/445 |
| 2,689,841 | 9/1954 | Augustin | 524/447 |
| 2,867,590 | 1/1959 | Harris | 523/215 |
| 2,919,260 | 12/1959 | Augustin | 524/447 |
| 2,982,665 | 5/1961 | Wilcox | 523/216 |
| 3,627,723 | 12/1971 | Kealy et al. | 264/170 |
| 3,840,382 | 10/1974 | Burke | 523/351 |
| 3,902,915 | 9/1975 | Crawford et al. | 106/308 X |
| 3,910,866 | 10/1975 | Morris | 525/370 |
| 3,922,240 | 11/1975 | Berg et al. | 524/236 |
| 3,998,778 | 12/1976 | Berg et al. | 524/571 |

*Primary Examiner*—Herbert J. Lilling
*Attorney, Agent, or Firm*—William H. Magidson; William T. McClain; Ralph C. Medhurst

[57] ABSTRACT

A rubber composition containing carbon black and a second particulate filler of kaolin, metakaolin, talc, pyrophyllite coal, coke, graphite or metal carbonate filler and a method of making it are disclosed.

37 Claims, 3 Drawing Figures

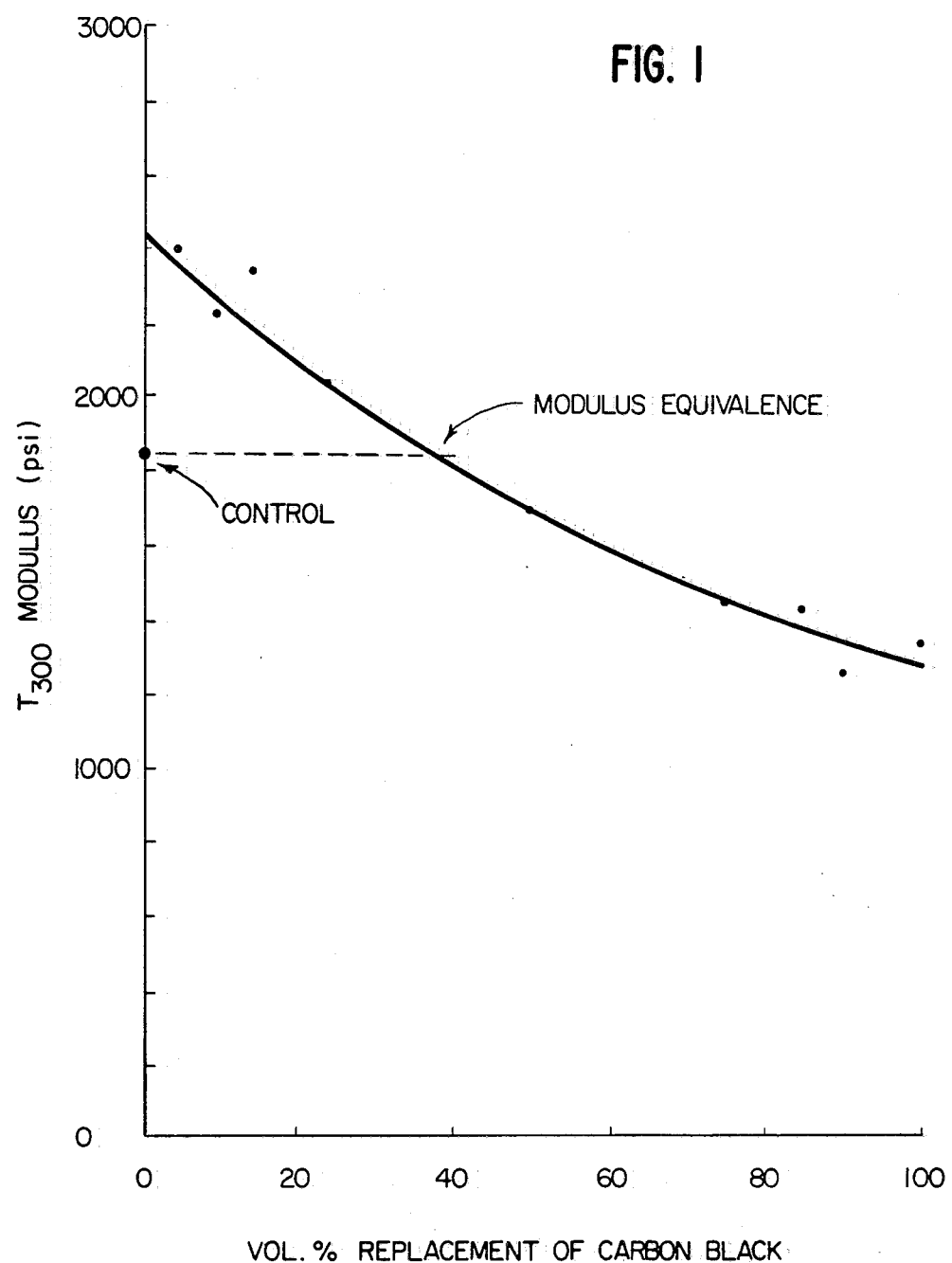

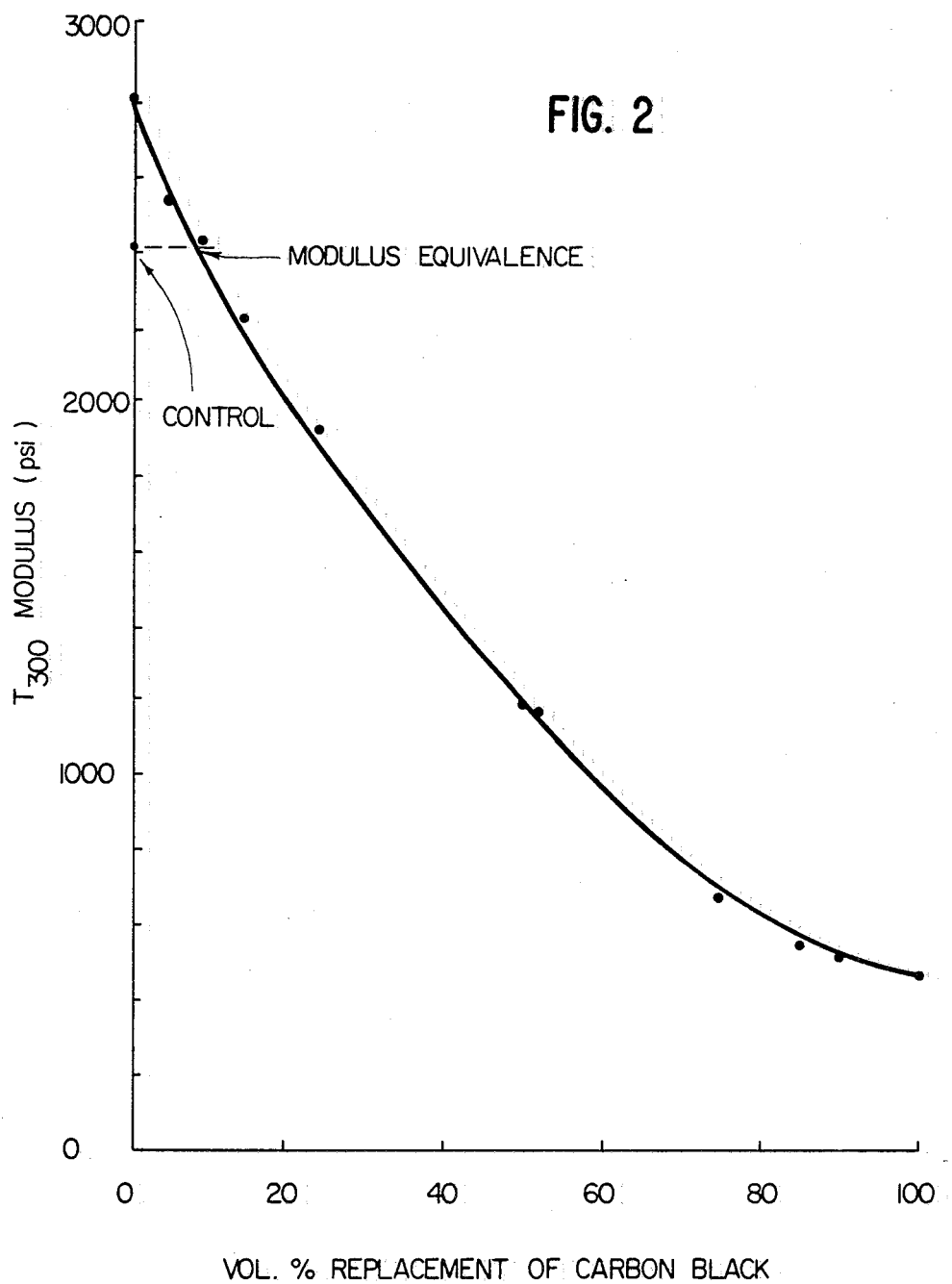

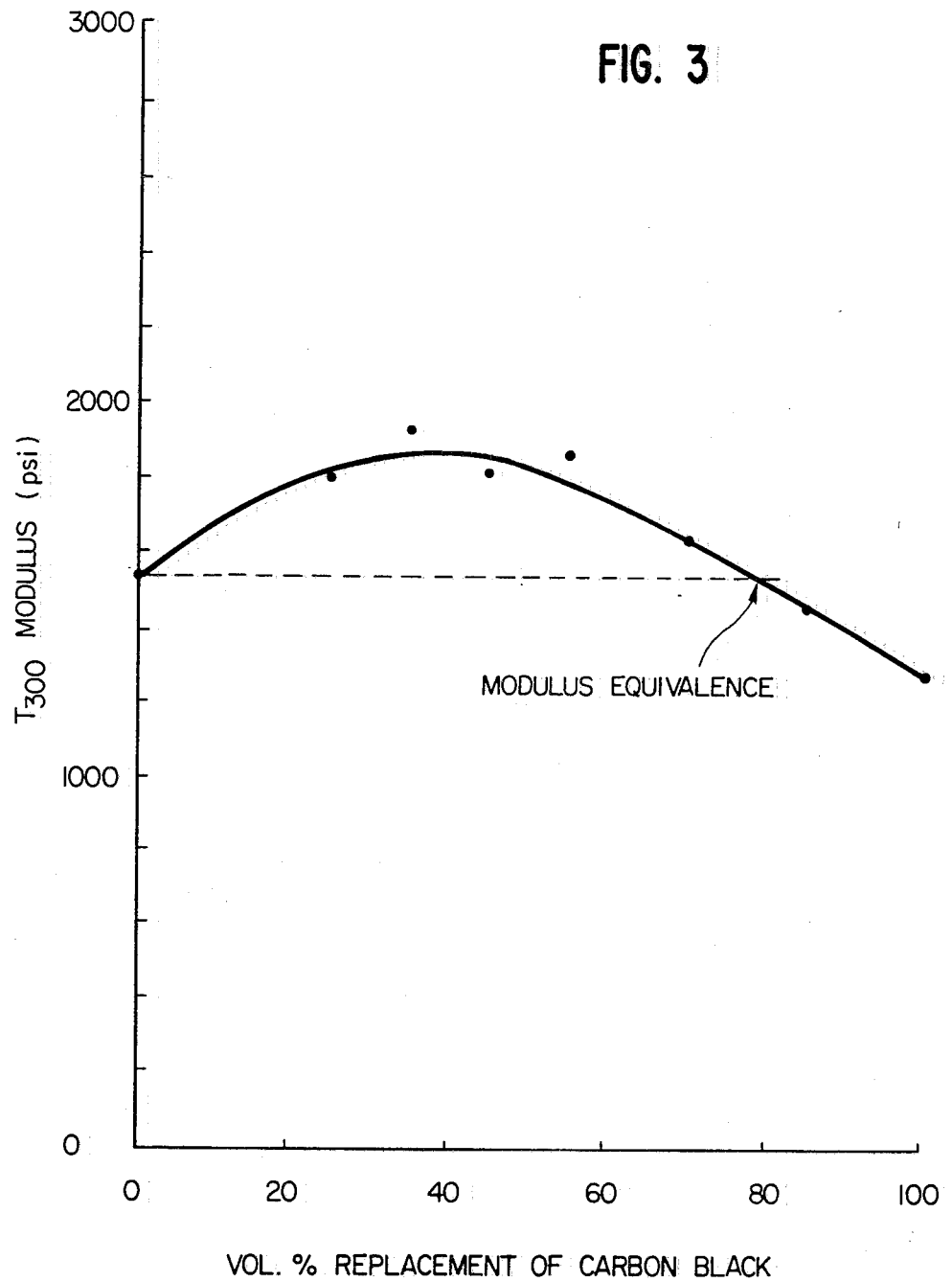

RUBBER COMPOSITION AND METHOD

REFERENCE TO RELATED APPLICATION

This is a continuation-in-part application of copending U.S. application Ser. No. 534,347, filed Sept. 21, 1983 and now abandoned, which is a continuation of U.S. application Ser. No. 398,995, filed July 16, 1982, and now abandoned.

BACKGROUND OF THE INVENTION

This invention relates generally to a rubber composition and more particularly concerns a rubber composition comprising carbon black and a second reinforcing filler consisting of kaolin, metakaolin, pyrophyllite, talc, coal, coke, or metal carbonate.

The precise formulation of any rubber compound depends on its intended end use. Different end uses require very specific mechanical properties. To a degree, the choice of filler and agent for coupling the rubber and filler determines the mechanical properties of the rubber compound. Because of the properties imparted to rubber compositions by carbon black, carbon black is the primary reinforcing filler almost universally used in certain types of rubber compositions, for example, those intended for use in tires for automobiles, trucks or other equipment. However, because of increases in the prices of petroleum products in general, and carbon black in particular, there has been great interest in replacing all or at least a significant part of the carbon black in rubber compositions with a less expensive material, in particular, one of the readily available non-carbon black fillers.

For example, Manual 3-S entitled "Sierra Mistron Vapor in Rubber Compounds," published in 1964 by Sierra Talc and Chemical Company (now Cyprus Mines Company), discloses that the replacement with talc of about 30 volume percent of the carbon black filler in a rubber composition affords a synergistic improvement in the tensile strength of the rubber composition.

Quaternary ammonium salts have also been disclosed for use with fillers or pigments. Technical Report 35-T entitled "Factors Affecting the Dispersion of Ultra-Fine Particle Size Mistron Talcs in Water and the Effects of Wetting and Dispersion Agents," published in 1956 by Sierra Talc & Clay Company (now Cyprus Mines Company) describes quaternary ammonium salts as effective dispersants for talc in water. Technical Report 48-T entitled "Mistrons in Hydrocarbon Solvents—Effects of Cationic Surfactants," published in 1958 by the former Sierra Talc & Clay Company describes certain quaternary ammonium salts as dispersants of talc in plastics, rubber and other polymeric dispersions. German Offenlegungsschrift 2,224,003 which issued in 1972 contains a very similar disclosure, E. K. Lotakova, G. A. Blokh, E. V. Tsipenyuk, I. G. Lebed, T. G. Blokh, F. D. Ovcharenko, N. G. Vasileo, A. D. Chugai and V. A. Mashchenko, "Properties of Rubbers Filled with Modified Kaolins," Kozh.-Obuvn. Prom-st. Vol. 18(6), pp. 45-7 (1976) discloses the reinforcement of rubber with kaolin modified with benzyldimethylalkylammonium chloride. N. S. Gilinskaya, G. A. Sankina, M. S. Skorobogatova, "Effect of the Chemical Nature of Dihydric Phenols and Quaternary Ammonium Salts on the Properties of Vulcanized Rubbers Made from the Rubber SKR-26," Kauch. Rezina, Vol. 3, pp. 10-12 (1980) discloses the vulcanization of flourorubber in the presence of quaternary ammonium salts.

Burke, U.S. Pat. Nos. 3,686,113; 3,689,452; and 3,840,382 disclose a rubber composition comprising a silica pigment, a quaternary ammonium salt and carbon black. Berg et al., U.S. Pat. Nos. 3,846,365; 3,922,240; and 3,998,778 disclose a method for making a powdered, flowable rubber composition comprising a solid filler wherein a quaternary ammonium salt is used as an emulsifier. Although In Berg et al. disclose in each patent that the filler is preferably carbon black, they state in each case that in place of or "in addition thereto, light-colored fillers can also be used, e.g., highly active silicic acid, kaolin, ground slate, etc." and in U.S. Pat. No. 3,922,240 that "[c]ombinations of carbon black with light-colored fillers, preferably silicic acid, are also possible." In the Berg methods, the rubber and filler composition is formed by pouring an aqueous emulsion of the filler, rubber elastomer, and the quaternary salt emulsifier into a sodium silicate solution, from which the granular rubber precipitates. Although Berg does not disclose the composition of the rubber granules, analysis of a polybutadiene rubber produced by a duplication of Example 1 of the '778 patent showed the rubber contained about 53 weight % of the silicate in the precipitating solution. Thus, all rubber compositions produced by Berg contain $SiO_2$ as an unavoidable element. Moreover, Berg does not disclose the beneficial effect on modulus properties of a quaternary ammonium salt added as a coupling agent to rubber before vulcanization. Finally, the Berg et al. patents do not contain a disclosure of additional particular minerals that could be beneficially used in combination with carbon black and a quaternary ammonium salt in a rubber composition.

U.S. Pat. No. 4,032,501, "Dry Blendable Solution Rubber Powders and Process," Schulz, issued June 28, 1977, like Berg, discloses a method of producing a rubber powder. As an emulsifier, Schulz employs a "foam inhibiting surfactant" which is disclosed as either a nonionic polyether alcohol or a tetraalkyl ammonium salt having more than 25 total carbon atoms. Schulz, however, does not disclose use of clay as a second reinforcing filler, nor does he disclose the quaternary salts as a coupling agent.

Kealy et al., U.S. Pat. No. 3,627,723, "Filler Loaded Elastomer Compositions Having Improved Extrudability and Physical Properties", issued Dec. 14, 1971, disclose rubber compositions of an α-olefin/non-conjugated diene copolymer, a filler of carbon black or mineral or mixtures thereof, and a surfactant. Named as possible mineral fillers are kaolin, calcined kaolin, magnesium silicate, blance fixe, whiting, silica and talc. The surfactant can be one of three broad classes, anionic, nonionic, and cationic, and named are quaternary ammonium salts. The Kealy Examples show little difference in rubber properties due to a change in the surfactant. In contrast, only a quaternary ammonium salt exhibits improved rubber properties when used with a rubber such as natural rubber or styrene-butadiene rubber.

SUMMARY OF THE INVENTION

The present invention is a method of compounding rubber. The method comprises mechanically mixing and substantially uniformly dispersing A, B, C or D in natural rubber, polyisoprene rubber, styrene-butadiene rubber, or polybutadiene rubber. A comprises (1) a particulate Agent G selected from the group consisting of kaolin, metakaolin, talc, pyrophyllite, coal, coke, and a metal carbonate and having a median particle size in the range of from about 0.01 to about 20 microns, (2) particulate carbon black having a median particle size in the range of from about 0.001 to about 20 microns, and (3) a quaternary ammonium salt as a coupling agent at a level of from about 0.005 to about 15 phr. B comprises (1) a particulate adduct of Agent G and the quaternary ammonium salt, having a median particle size in the range of from about 0.01 to about 20 microns and present at a level such that the portion thereof contributed from the quaternary ammonium salt is at a level of from about 0.005 to about 15 phr, and (2) the particulate carbon black.

C comprises (1) a particulate adduct of the carbon black and the quaternary ammonium salt, having a median particle size in the range of from about 0.001 to about 20 microns and present at a level such that the portion thereof contributed from the quaternary ammonium salt is at a level of from about 0.005 to about 15 phr, and (2) particulate Agent G. D comprises (1) a particulate adduct of Agent G and the quaternary ammonium salt having a median particle size in the range of from about 0.01 to about 20 microns and present at a level such that the portion thereof contributed from the quaternary ammonium salt is at a level of from about 0.005 to about 15 phr, and (2) a particulate adduct of the carbon black and the quaternary ammonium salt having a median particle size in the range of from about 0.001 to about 20 microns and present at a level such that the portion thereof contributed from the quaternary ammonium salt is at a level of from about 0.005 to about 15 phr.

In the resulting rubber composition, the combined contents of (1) Agent G or the portion of the adduct contributed from Agent G and (2) the carbon black or the portion of the adduct contributed from the carbon black are in the range of from about 5 to about 400 phr and the weight ratio of (1) Agent G or the portion of the adduct contributed from Agent G -to- (2) the carbon black or the portion of the adduct contributed from the carbon black is in the range of from about 1:19 to about 9:1.

The present invention is also a rubber composition formed by the aforesaid method. The present invention is further a rubber composition comprising a substantially uniform dispersion of A, B, C, D or E, with the relative concentration of Agent G and the carbon black as set forth above. E is B, C or D wherein the particulate adduct in B or C and at least one of the particulate adducts in D is also an adduct with the rubber.

BRIEF DESCRIPTION OF THE DRAWINGS

FIG. 1 is a plot of $T_{300}$ modulus versus amount of clay in a natural rubber composition.

FIG. 2 is a plot of $T_{300}$ modulus versus amount of clay in a styrene-butadiene rubber composition.

FIG. 3 is a plot of $T_{300}$ modulus versus amount of clay in natural rubber compositions designed to have at least equivalent properties to a purely carbon black filled rubber.

DETAILED DESCRIPTION

According to the method of the present invention, the aforesaid quaternary ammonium salt, carbon black and a second filler selected from the group consisting of kaolin, metakaolin, talc, pyrophyllite, calcium carbonate, coke, and coal can be mechanically mixed in any convenient, conventional rubber compounding process to form the resulting rubber composition of this invention. The rubber can suitably be natural rubber, synthetic polyisoprene rubber, polybutadiene rubber, or styrene-butadiene rubber since vulcanizates of these rubbers exhibit improved properties. Preferably, the rubber comprises natural rubber because natural rubber vulcanizates exhibit more improved modulus over that of these other rubbers. Mixtures of natural rubber with other rubbers such as those above wherein natural rubber comprises at least about 5%, and more preferably at least about 30%, of the total rubber are also preferred. Thirty percent natural rubber mixtures are more preferred over five percent mixtures because of higher modulus.

While any of the conventional curing agents known to the art can be employed in this method of compounding the rubber composition of this invention, typical curing agents include sulfur or sulfur-donating materials (in combination with suitable accelerators) and peroxide and other free radical producing agents. Preferably, sulfur or a sulfur-donating material is employed.

The second reinforcing filler—other than carbon black and designated as Agent G—employed in the method and composition of the present invention is selected from the group consisting of kaolin, metakaolin, talc, pyrophyllite, coal, coke, and metal carbonate, and preferably is selected from the group consisting of talc, kaolin and coal, and more preferably is kaolin because of its intrinsic fine particle size.

The median particle size of the particles which contain the filler other than carbon black and which either are designated as Agent G or are adducts of Agent G and the quaternary ammonium salt, in the method and rubber composition of this invention, preferably is in the range of from about 0.1 micron to about 5 microns. In the present context, the median particle size is determined from a plot of the weight percent of particles having spherical diameter.

By the term "carbon black" as used herein is meant any carbon black suitable for use by the rubber industry and set forth under the title "carbon blacks" at pages 186–192 of the publication entitled "Rubber World Blue Book" published by B. C. Kovach for Rubber World in 1981 and incorporated herein by reference. Typical suitable carbon blacks include carbon blacks having the ASTM designations N220, N330, N550, and N660.

The median particle size of the carbon black particles in the method and rubber composition of this invention preferably is in the range of from about 0.001 micron to about 1 micron.

The combined contents of (1) Agent G or the portion of the aforesaid adduct contributed from Agent G and (2) the carbon black or the portion of the aforesaid adduct contributed from carbon black are preferably in the range of from about 30 to about 200 phr, more preferably to about 120 phr. The weight ratio of (1) Agent G or the portion of the aforesaid adduct contributed from Agent G -to- (2) the carbon black or the portion of the aforesaid adduct contributed from the carbon black is preferably in the range of from about 1:19, more preferably from about 1:9, to about 1:1.

However, Applicants prefer to determine the amounts of the second filler used in the compositions of the invention on a volume % of the carbon black replaced. (This assumes that the amount of carbon black is first determined, as in the ASTM-NR formula where 50 phr carbon black is used.) The volume % of carbon black replaced is suitably from about 5 to 80%, and preferably 5–40 vol.%, which is preferred because compositions in this range with the preferred filler kaolin produce vulcanizates having significant properties, such as $T_{300}$ modulus, ultimate elongation and ultimate tensile strength, which are at least equivalent to the properties of purely black reinforced rubber. Examples 62–70 below illustrate this range. Finally, when replacing carbon black with the second filler on a volume basis, the total amount of reinforcing filler (clay plus carbon black) on a phr basis can exceed the amount of filler in the original rubber formula due to different filler densities.

Without wishing to be bound by theory, Applicants believe the quaternary ammonium salt functions as a coupling agent for the carbon black and mineral to the rubber. Applicants further believe the quaternary salt functions as a coupling agent by (1) increasing the amount of crosslinking between all essential components in the rubber and (2) by wetting of the filler surface. The evidence for the functioning as a coupling agent is the increase in $T_{300}$ modulus seen when the quaternary salt is added. The modulus data is discussed below with the Examples.

Any quaternary ammonium salt can be used in the rubber composition of this invention. Suitable quaternary ammonium salts for use in the rubber composition of this invention are disclosed in Burke, U.S. Pat. No. 3,686,113, column 5, line 11 to column 7, line 75, which is incorporated by reference herein. In addition, for the present purposes, "quaternary ammonium salts" include any cyclic salt which contains either within its ring structure or as a substituent on its ring structure at least one nitrogen atom covalently bonded to three moieties and which salt has a highly conjugated, resonance stabilized, substantially planar structure which can be depicted such that the aforesaid nitrogen atom is attached to one of the aforesaid moieties through a double bond and carries a positive charge. Readily available examples of such compounds include the following: acid fuchsin, acridine red, acridine orange, aniline blue, azure A, azure B, azure C, basic fuchsin, blue tetrazolium, brilliant green, 2-tertiary butyl-5-methylisoxazolium tetrafluoroborate, coomassie brilliant blue R, crystal violet, 3,3′-(3,3′-dimethoxy-4,4′-biphenylene)bis[2-(p-nitrophenyl)-5-phenyltetrazolium chloride], 3-(4,5-dimethyl-2-thiazolyl)-2,5-diphenyl-2H-tetrazolium bromide, ethyl violet, fast green FCF, 1-(p-hydroxyphenyl)-2,4,6-triphenylpyridine betaine, 2-(p-iodophenyl)-3-(p-nitrophenyl)-5-phenyl-2H-tetrazolium chloride, janus green B, light green SF yellowish, lissamine rhodamine B sulfonyl chloride, methylene blue, methyl green, methyl violet, nile blue A perchlorate, nitron, oxazine 1 perchlorate, pararosaniline acetate, pyronin B, pyronin Y, rhodamine B, rhodamine 6G, rhodamine 110, rhodamine 6G perchlorate, safranin 0, thiamine hydrochloride, toluidine blue 0, 2,3,5-triphenyl-2H-tetrazolium chloride, xylene cyanole FF, oxacarbocyanine, methylene green, cyanine, carbocyanine, styryl thiacarbocyanine, and 1,1-diethyl-2,2-quinocyanine chloride. In general, many sensitizing dyes are positively charged cyclic compounds with structures that meet the aforesaid requirements. Representative classes of such dyes which are suitable as quaternary ammonium salts include the following: cyanines, merocyanines, carbocyanines, thiacyanines and benzothiazolylrhodanines.

Preferably, the quaternary ammonium salt has a structure of formula I, II, III, IV or V.

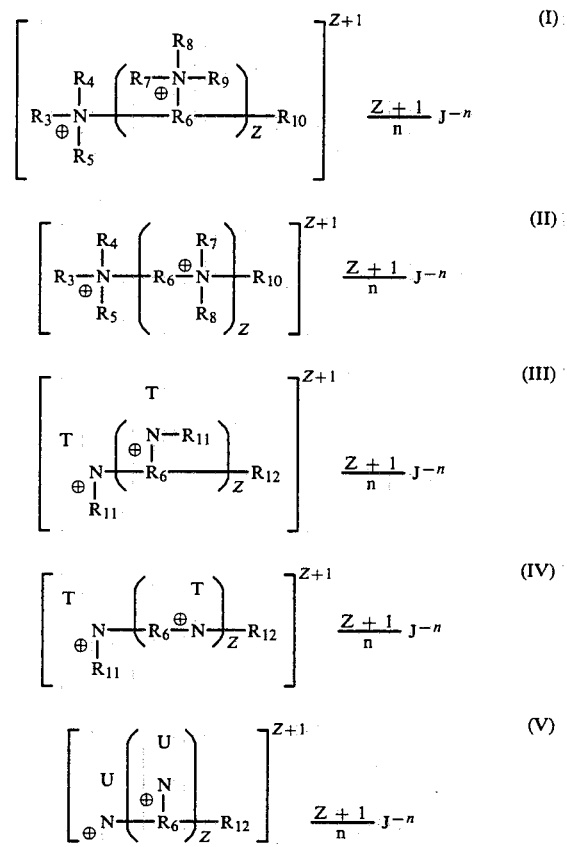

In formulas I, II, III, IV and V, Z is zero or a positive integer from 1 to 100, J is an anionic radical, n is the absolute value of the oxidation state of J and $R_6$ is an alkylenyl radical containing from 2 to 20 carbon atoms or an aryl radical containing from 6 to 14 carbon atoms.

In formulas I and II, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; straight- or branched-chain aliphatic radicals containing a total of from 8 to 40 carbon atoms which are saturated or unsaturated and unsubstituted or substituted with at least one hydroxy, alkoxy or polyalkoxy group; and aryl radicals containing from 6 to 18 carbon atoms; and saturated or unsaturated araliphatic radicals containing a total of from 7 to 48 carbon atoms.

In formulas I and II, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom.

In formulas I and II, (1) at least one of $R_3$, $R_4$, $R_5$, $R_7$, $R_8$, $R_9$, and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms, or (b) at least two of $R_3$, $R_4$, $R_5$, $R_7$, $R_8$, $R_9$ and $R_{10}$ are aliphatic radicals containing at least 8 carbon atoms.

In formulas III and IV, $R_{11}$ is selected from the group consisting of the groups described by $R_3$, $R_4$, $R_5$, $R_7$, $R_8$ and $R_9$ and alkylamidoalkyl and alkylesteralkyl groups containing a total of at least 14 carbon atoms. In formulas III, IV and V, when Z is zero, $R_{12}$ is selected from the group consisting of the groups described by $R_{11}$, and when Z is a positive integer, $R_{12}$ is selected from the group consisting of the groups described by $R_{11}$ and a hydrogen atom.

In formulas III, IV and V, each of T and U is a radical which, in conjunction with each nitrogen atom to which it is shown attached in formula III, iV or V, forms a heterocyclic radical containing at least one nitrogen atom in the ring system and containing only nitrogen and carbon atoms in the ring system, and the T and U portions of the ring system are unsubstituted, or substituted by at least one alkyl group with the total number of ring substituents on each of T and U being from 1 to 32 carbon atoms.

In formulas I, II, III, IV and V, Z preferably is zero or a positive integer from 1 to 5 and more preferably is zero or 1. J is suitably an organic radical such as methyl sulfate or acetate or an inorganic radical such as halide, nitrite, nitrate, sulfate or phosphate.

If $R_3$, $R_4$, $R_5$, $R_7$, $R_8$, $R_9$, $R_{10}$, $R_{11}$, or $R_{12}$ is an aliphatic radical containing from 1 to 3 carbon atoms, preferably the radical is a methyl radical. If $R_3$, $R_4$, $R_5$, $R_7$, $R_8$, $R_9$, $R_{10}$, $R_{11}$, or $R_{12}$ is an aliphatic radical containing at least 8 carbon atoms, such radical preferably contains from 12 to 22 carbon atoms. Furthermore, if $R_3$, $R_4$, $R_5$, $R_7$, $R_8$, $R_9$, $R_{10}$, $R_{11}$ or $R_{12}$ is an aliphatic radical containing at least 8 carbon atoms and a polyalkoxy radical, preferably the polyalkoxy radical contains from 2 to 15 repeating ethoxy radical units.

If $R_3$, $R_4$, $R_5$, $R_7$, $R_8$, $R_9$, $R_{10}$, $R_{11}$, or $R_{12}$ is an araliphatic radical, such radical preferably contains from 7 to 22 carbon atoms.

Preferably, at least one of $R_3$, $R_4$, $R_5$, $R_7$, $R_8$, $R_9$, $R_{10}$, $R_{11}$ and $R_{12}$ is a methyl radical. At least one of $R_3$, $R_4$, $R_5$, $R_7$, $R_8$, $R_9$, $R_{10}$, $R_{11}$ and $R_{12}$ is preferably an aliphatic radical containing at least 12 carbon atoms, more preferably an aliphatic radical containing from 12 to 22 carbon atoms and most preferably a straight-chain aliphatic radical containing from 12 to 22 carbon atoms.

$R_6$ is preferably an alkylenyl radical containing from 2 to 6 carbon atoms and more preferably an alkylenyl radical containing 2 or 3 carbon atoms.

The sole difference between T in formulas III and IV and U in formula V is that T is attached through two single bonds to the nitrogen atom shown in formulas III and IV, and U is attached through one single and one double bond to the nitrogen atom shown in formula V.

Typical quaternary ammonium radicals formed by T or U in conjunction with the nitrogen atom to which it is shown attached in formula III, IV or V include the following: pyrrolidinium, pyrrolium, pyrrolinium, imidazolinium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinazolinium, quinoxalinium, naphthyridinium, quinolizinium, carbazolium, acridinium, phenazinium, phenanthridinium, phenanthrolinium, benzo[H]isoquinolinium, purinium, porphinium, and pteridinium and the quaternary ammonium salts formed by partial or complete hydrogenation of the heterocylic rings of any of the aforesaid quaternary ammonium salts.

Preferably the quaternary ammonium salt radical formed by T or U in conjunction with the nitrogen atom to which it is shown attached in formula III, IV or V is an imidazolinium salt or a pyridinium salt.

In the rubber composition of this invention formed according to the method of this invention, the quaternary ammonium salt is at a level of from about 0.005 phr, preferably from about 0.10 phr, to about 15 phr, more preferably to about 1.5 phr. If introduced directly in the method of this invention, the quaternary ammonium salt is introduced at a level in the range of from about 0.005 phr, preferably from about 0.10 phr, to about 15 phr, preferably to about 1.5 phr. If the quaternary ammonium salt is introduced in the method of this invention in the form of one of its aforesaid adducts with the particles, carbon black or other filler, such adduct is introduced at a level such that the portion of the adduct contributed from the quaternary ammonium salt is introduced at a level of from about 0.005 phr, preferably from about 0.10 phr, to about 15 phr, preferably to about 1.5 phr.

Applicants prefer to use quaternary in an amount less than about 1.5 phr because amounts above this can result in "bleed-out." This refers to the appearance of a waxy film on the vulcanizate surface when greater than 1.5 phr quaternary is used. Vulcanizates exhibiting the waxy film demonstrate inconsistent properties in that some can have lower tensile properties and can be more difficult to process than those with less than 1.5 phr quaternary.

Other desirable rubber additives such as for example cure accelerators, anti-oxidants, and plasticizers can be used in the invention. Examples of such additives include lignin and pine tar.

Preparation of the rubber composition of this invention by the method of this invention can be effected by any mechanical mixing method which can accommodate the introduction of the quaternary ammonium salt and the particulate fillers. Whether the carbon black filler, noncarbon black filler and quaternary ammonium salt are introduced in the compounding process simultaneously or at different stages or whether as separate components or in the form of their various adducts as described hereinabove is generally a matter of convenience. In certain instances, for example, when the quaternary ammonium salt is difficult to disperse uniformly in the rubber, it is preferred to first form an adduct of it with either the carbon black or non-carbon black filler or both and then to disperse the adduct in the rubber.

In one suitable method of preparation, a batch of natural and/or synthetic rubber is initially mixed in a conventional internal mixer such as a Banbury mixer. As mixing proceeds, the temperature of the rubber increases. When the temperature reaches a temperature in the range of from about 40° C. to about 60° C., a metallic oxide, typically zinc oxide, at a level of from about 1 to about 10 phr, a fatty acid, typically stearic acid, at a level of from about 0.5 to about 5 phr, and an antiozonant, typically N-(1,3-dimethylbutyl)-N-phenyl-p-phenylenediamine, at a level of from about 0.5 to about 7 phr, an antioxidant, typically polymerized 1,2-dihydro-2,2,4-trimethylquinoline, at a level of from about 0.5 to 5 phr and a petroleum wax at a level of from about 0.5 to 5 phr are introduced into the rubber during mixing. In the alternative, the oxide, fatty acid, antiozonant, antioxidant and wax can be introduced initially with the rubber.

Mixing is then continued until the temperature of the mixing increases to a temperature in the range of from about 70° C. to about 80° C., at which point a softening agent, such as process oil, and the carbon black and non-carbon black particulate fillers and quaternary ammonium salt are added.

Mixing is continued until the temperature of the mixture reaches about 80° C. to about 90° C. At this point the curing agent(s) is (are) added at a level of from about 1 to about 10 phr, and mixing is continued until the temperature reaches about 110° C. or for about a minute, whichever is shorter. Typical curing agents include sulfur and sulfur-donating materials (in combination with suitable accelerators commonly known in the art) and peroxides and other free radical producing systems.

The resulting mixture is then removed from the mixer and formed into a predetermined shape, for example, sheets. After storing overnight, the shaped mixture is cured by pressure molding at 160° C. for about a period of time corresponding to $T_c(90)$, as defined hereinafter.

In the alternative, a particulate adduct of either of the carbon black or non-carbon black filler particles and the quaternary ammonium salt may be formed in a separate pretreatment step, and the resulting adduct, instead of the separate components from which the adduct is made, is introduced into the rubber in the above procedure. For example, one particulate adduct of the non-carbon black filler particles and the quaternary ammonium salt is prepared by agitating the mineral particles in a Littleford Brothers Model KM 130 Mixer. Then the quaternary salt component of the adduct to be made, diluted in a solvent such as process oil or isopropyl alcohol if desired, is sprayed through a nozzle into the agitated mineral particles, and the resulting mixture is stirred for about 15 minutes and is thereafter removed from the mixer. If a solvent is used and is removed by drying, the drying temperature should not exceed the decomposition temperature when in the adduct of the quaternary salt. For example, Adogen 470 used in the Examples decomposes in an adduct at about 80° C.

More simply, the quaternary ammonium salt is introduced into either the carbon black or non-carbon black filler or both and the mixture is blended in a dry blend mixer to a uniform consistency. The resulting adduct is then dried overnight.

The following examples describe in more detail compositions and methods illustrative of the present invention. It will be apparent to those skilled in the art that many modifications, both of materials and methods, may be practiced without departing from the purpose and intent of this disclosure.

EXAMPLES 1-44

A batch containing varying amounts of natural rubber, 50 phr of polybutadiene rubber and varying amounts of a master batch containing 50.5 weight percent of natural rubber, 40.4 weight percent of ASTM N330 carbon black, 8.1 weight percent of light process oil (Witco's Cyclolube NN-2) and 1 weight percent of the plasticizer Reogen TM (manufactured by R. T. Vanderbilt) was employed in each of Examples 1-44. In each case, the batch was introduced into a water-cooled 2-roll external mill in which the rolls were set to a thickness of 1/16 inch and one roll was operated at 14 rpm and the second roll at 18 rpm and the rubber was mixed until a band formed. At this point 3 phr of zinc oxide and 2 phr of stearic acid were introduced onto the mill, and mixing was continued until the zinc oxide and stearic acid were fully incorporated into the rubber and the mixture appeared homogeneous. Next, the band was cut to form a sheet of the rubber mixture, which was then removed from the mill folded over on itself, and turned and reinserted into the mill so that the reinserted sheet traveled through the mill along a line in the reinserted sheet which was approximately perpendicular to the line in the sheet along which the sheet last traveled through the mill. The process of cutting, removing, folding, turning and reinserting was repeated nine times. The reinserted sheet was then allowed to again form a band in the mill, at which point the 2 phr of antiozonant Santoflex 13F (N-(1,3-dimethylbutyl)-N-phenyl-p-phenylenediamine) marketed by Monsanto and 2 phr of the antioxidant Agerite D (polymerized 1,2-dihydro-2,2,4-trimethylquinoline) marketed by R. T. Vanderbilt, and 3 phr of petroleum wax (Witco Chemical's Sunolite 240) were introduced into the mill and mixing was continued until the antioxidant, antiozonant and wax were fully incorporated into the rubber and the mixture appeared homogeneous. At this point additional light process oil (Witco Cyclolube NN-2), varying amounts of a quaternary ammonium salt and of either talc (Cyprus Industrial Minerals Mistron Vapor ® having a median particle size of about 1.8 microns and a specific surface area of about 16 square meters per gram or Mistrolite TM having a median particle size of about 2.4 microns and a specific surface area of about 10.9 square meters per gram), calcium carbonate (Supermite TM of Thompson Weinman having a mean particle size of about 1 micron and a specific surface area of about 7.7 square meters per gram), or coal (Kofil TM supplied by Harwick Chemical Company having an average particle size of about 3 microns) were added to the mixture in the mill. The process of milling, cutting the band, removing the resulting sheet from the mill and folding, turning and reinserting the sheet as described above was performed eight times. The band was then cut and the rubber sheet was removed from the mill and allowed to cool for up to an hour. The sheet was then reinserted in the mill and rebanded and 2 phr of sulfur and 0.8 phr of the accelerator N-t-butyl-2-benzothiazole sulfenamide (Monsanto's Santocure NS) were added. The process of milling, cutting the band, removing the resulting sheet from the mill and folding, turning and reinserting the sheet as described above was performed eight times. The amounts of the master batch, additional rubber, quaternary ammonium salt, carbon black filler, non-carbon black filler and light process oil employed in each example are shown in Table I.

At this point the rubber mixture was cut and removed from the 2-roll mill, and the resulting sheets were cooled and stored at room temperature overnight. Prior to vulcanization, the sheets were remilled in the 2-roll mill. The remilled sheets were vulcanized at 160° C. using a compression molding technique. The vulcanized products were then tested by standard methods to determine their rheometric, static, dynamic, tear, hardness, rebound and flex fatigue properties, as described hereinbelow.

In each of Examples 2-7, 9-17, 19-24, 26-27 and 43-44 the non-carbon black filler employed was talc. Mistron Vapor TM was employed in Examples 2-7, 9-17, 19-24 and 26-27. Mistrolite TM was employed in Examples 43-44. Coal was the non-carbon black filler employed in Examples 28-29, and calcium carbonate was the non-carbon black filler employed in Examples 30, 31 and 35–41. Ditallow dimethyl ammonium chloride was the quaternary ammonium salt employed in Examples 2–7, 9–15, 18, 20, 22, 24, 26, 28, 30, 32 and 33; di[hydrogenated tallow] dimethyl ammonium chloride was the quaternary ammonium salt employed in Examples 36, 38, 39 and 41; and tallow trimethyl ammonium chloride and N,N,N',N',N'-pentamethyl-N-tallow-1,3-propanediammonium chloride were the quaternary ammonium salts employed in Examples 43 and 44, respectively.

The rheometric data were obtained using ASTM test D-2084-75 with a 1° amplitude of oscillation of the test disk about its center position and at 320° F. and are presented in Table II. $M_L$ and $M_H$ represent the minimum torque and maximum torque, respectively. $T_{S2}$ represents the time to 2 units of torque increase above the minimum and is accepted as the scorch time. $T_c(10)$ and $T_c(90)$ represent the times to 10 and 90 percent, respectively, of full torque development, and $T_c(90)$ is accepted as the cure time.

The static properties were measured in accordance with ASTM test D-412-75 Method A, and the test results are presented in Table III. $E_u$ and $T_u$ represent the ultimate elongation and ultimate tensile strength, respectively. $T_{100}$, $T_{200}$, $T_{300}$ and $T_{400}$ represent the tensile strength at 100, 200, 300 and 400 percent elongation, respectively.

The dynamic properties were measured using a Dynastat Viscoelastic Analyzer marketed by Imass, Inc. of Accord, Mass. The test samples were each in the shape of a cylindrical button of 0.5-inch diameter and 0.375-inch height. The results are presented in Table IV. The reported results were obtained at a frequency of 10 Hertz and at room temperature. M' represents the storage or elastic modulus, and M" represents the viscous or loss modulus. M' and M" are denoted and measured as E' and E" on the Dynastat Analyzer. Tan Delta is the quotient obtained by dividing M" by M'. Tan Delta is a property which is indicative of heat buildup with cyclical flexing and is an important characteristic in compositions for use as tire sidewall and tread stock. These dynamic properties can also be measured by other techniques known in the art.

The tear resistance properties were measured by ASTM test D-624-73-Die C Method and are reported in Table V. Also reported in Table V are values for the Shore A Hardness, Rebound D and fatigue. Shore A Hardness was measured using ASTM test D-2240-75. Rebound D was measured using ASTM test D-2632. Fatigue was measured using the Monsanto Fatigue To Failure Tester and method.

TABLE I

| Example No. | Master Batch | Rubber | 4° Salt | Carbon Black | Non-Black Filler | Additional Process Oil |
|---|---|---|---|---|---|---|
| 1 | 99 | — | — | 40 | — | — |
| 2 | 59.4 | 20 | 0.24 | 24 | 24 | 3.2 |
| 3 | 59.4 | 20 | 0.48 | 24 | 24 | 3.2 |
| 4 | 59.4 | 20 | 0.96 | 24 | 24 | 3.2 |
| 5 | 59.4 | 20 | 0.33 | 24 | 16 | 3.2 |
| 6 | 59.4 | 20 | 0.65 | 24 | 16 | 3.2 |
| 7 | 59.4 | 20 | 0.16 | 24 | 16 | 3.2 |
| 8 | 99 | — | — | 40 | — | — |
| 9 | 69.3 | 15 | 0.18 | 28 | 18 | 2.4 |
| 10 | 59.4 | 20 | 0.24 | 24 | 24 | 3.2 |
| 11 | 49.5 | 25 | 0.30 | 20 | 30 | 4.0 |
| 12 | 39.6 | 30 | 0.36 | 16 | 36 | 4.8 |
| 13 | 29.7 | 35 | 0.42 | 12 | 42 | 5.5 |
| 14 | 19.8 | 40 | 0.48 | 8 | 48 | 6.4 |
| 15 | 9.9 | 45 | 0.54 | 4 | 54 | 7.2 |
| 16 | 99 | — | — | 40 | — | — |
| 17 | 79.2 | 10 | — | 32 | 12 | 1.6 |
| 18 | 79.2 | 10 | 0.12 | 32 | 12 | 1.6 |
| 19 | 59.4 | 20 | — | 24 | 24 | 3.2 |
| 20 | 59.4 | 20 | 0.24 | 24 | 24 | 3.2 |
| 21 | 39.6 | 30 | — | 16 | 36 | 4.8 |
| 22 | 39.6 | 30 | 0.36 | 16 | 36 | 4.8 |
| 23 | — | 50 | — | — | 60 | 8 |
| 24 | — | 50 | 0.60 | — | 60 | 8 |
| 25 | 99 | — | — | 40 | — | — |
| 26 | 59.4 | 20 | 0.24 | 24 | 24 | 3.2 |
| 27 | 59.4 | 20 | — | 24 | 24 | 3.2 |
| 28 | 59.4 | 20 | 0.16 | 24 | 16 | 3.2 |
| 29 | 59.4 | 20 | — | 24 | 16 | 3.2 |
| 30 | 59.4 | 20 | 0.24 | 24 | 24 | 3.2 |
| 31 | 59.4 | 20 | — | 24 | 24 | 3.2 |
| 32 | 99 | — | 0.20 | 40 | — | — |
| 33 | 99 | — | 0.40 | 40 | — | — |
| 34 | 99 | — | — | 40 | — | — |
| 35 | 79.2 | 10 | — | 32 | 12 | 1.6 |
| 36 | 79.2 | 10 | 0.10 | 32 | 12 | 1.6 |
| 37 | 59.4 | 20 | — | 24 | 24 | 3.2 |
| 38 | 59.4 | 20 | 0.21 | 24 | 24 | 3.2 |
| 39 | 59.4 | 20 | 0.42 | 24 | 24 | 3.2 |
| 40 | — | 50 | — | — | 60 | 8 |
| 41 | — | 50 | 0.52 | — | 60 | 8 |
| 42 | 99 | — | — | 40 | — | — |
| 43 | 59.4 | 20 | 0.24 | 24 | 24 | — |
| 44 | 59.4 | 20 | 0.24 | 24 | 24 | — |

TABLE II

| Example No. | $M_L$ (inch-lbs.) | $M_H$ (inch-lbs.) | $T_{S2}$ (min.) | $T_c(10)$ (min.) | $T_c(90)$ (min.) |
|---|---|---|---|---|---|
| 1 | 6.8 | 27.0 | 4.7 | 4.7 | 6.6 |
| 2 | 6.0 | 29.5 | 3.8 | 4.0 | 6.4 |
| 3 | 5.5 | 29.5 | 3.6 | 3.7 | 5.9 |
| 4 | 6.0 | 32.5 | 2.4 | 2.5 | 4.6 |
| 5 | 6.0 | 29.0 | 3.8 | 3.8 | 6.2 |
| 6 | 6.5 | 31.5 | 3.0 | 3.1 | 5.2 |
| 7 | 6.8 | 27.5 | 4.5 | 4.5 | 7.0 |
| 8 | 5.5 | 26.3 | 3.8 | 3.8 | 7.0 |
| 9 | 5.5 | 27.5 | 3.1 | 3.1 | 5.8 |
| 10 | 6.0 | 29.0 | 2.9 | 3.0 | 5.4 |
| 11 | 4.5 | 28.5 | 2.8 | 2.9 | 5.2 |
| 12 | 6.0 | 27.5 | 3.0 | 3.0 | 5.0 |
| 13 | 5.5 | 28.8 | 2.8 | 2.8 | 5.0 |
| 14 | 5.5 | 28.0 | 2.8 | 2.8 | 5.0 |
| 15 | 5.0 | 27.5 | 3.0 | 3.0 | 5.2 |
| 16 | 6.0 | 28.5 | 4.4 | 4.4 | 7.6 |
| 17 | 7.0 | 28.0 | 4.3 | 4.4 | 7.8 |
| 18 | 8.0 | 29.5 | 3.2 | 3.3 | 6.0 |
| 19 | 7.5 | 28.0 | 4.6 | 4.6 | 7.8 |
| 20 | 7.5 | 31.0 | 2.8 | 2.9 | 5.4 |
| 21 | 7.0 | 27.0 | 5.5 | 5.5 | 9.0 |
| 22 | 7.0 | 30.5 | 2.7 | 2.8 | 5.1 |
| 23 | 6.5 | 25.5 | 8.0 | 7.9 | 11.2 |
| 24 | 7.0 | 31.5 | 3.3 | 3.4 | 5.5 |
| 25 | 7.0 | 27.5 | 4.0 | 4.0 | 7.4 |
| 26 | 6.5 | 30.0 | 2.6 | 2.6 | 5.2 |
| 27 | 6.5 | 26.3 | 4.8 | 4.8 | 8.1 |
| 28 | 5.5 | 31.0 | 2.9 | 3.0 | 5.3 |
| 29 | 7.5 | 27.0 | 4.4 | 4.4 | 7.3 |
| 30 | 7.0 | 30.5 | 2.6 | 2.6 | 5.0 |
| 31 | 7.5 | 27.5 | 4.2 | 4.2 | 7.2 |
| 32 | 7.0 | 31.0 | 2.6 | 2.7 | 5.2 |
| 33 | 8.0 | 33.0 | 1.9 | 2.0 | 4.3 |
| 34 | 5.5 | 26.0 | 4.0 | 4.0 | 7.2 |
| 35 | 6.0 | 26.0 | 4.6 | 4.6 | 7.4 |
| 36 | 6.5 | 28.5 | 3.0 | 3.0 | 5.7 |
| 37 | 6.0 | 25.5 | 4.8 | 4.8 | 8.2 |
| 38 | 7.0 | 31.5 | 2.4 | 2.4 | 5.0 |
| 39 | 7.0 | 33.0 | 1.8 | 1.9 | 4.5 |

TABLE II-continued

| Example No. | Rheometric Properties | | | | |
|---|---|---|---|---|---|
| | $M_L$ (inch-lbs.) | $M_H$ (inch-lbs.) | $T_{S2}$ (min.) | $T_c(10)$ (min.) | $T_c(90)$ (min.) |
| 40 | 4.0 | 23.5 | 5.4 | 5.4 | 7.9 |
| 41 | 5.0 | 30.5 | 1.8 | 1.9 | 4.0 |
| 42 | 8.0 | 28.0 | 4.4 | 4.4 | 7.9 |
| 43 | 7.0 | 30.5 | 2.7 | 2.8 | 5.2 |
| 44 | 6.5 | 29.0 | 3.2 | 3.2 | 6.1 |

TABLE III

| Example No. | Static Properties | | | | | |
|---|---|---|---|---|---|---|
| | $E_u$ (%) | $T_u$ (psi) | $T_{400}$ (psi) | $T_{300}$ (psi) | $T_{200}$ (psi) | $T_{100}$ (psi) |
| 1 | 640 | 2304 | 1109 | 684 | 350 | 159 |
| 2 | 581 | 2169 | 1125 | 706 | 423 | 241 |
| 3 | 559 | 2187 | 1202 | 752 | 444 | 249 |
| 4 | 552 | 2292 | 1309 | 810 | 468 | 262 |
| 5 | 551 | 1987 | 1131 | 692 | 401 | 216 |
| 6 | 519 | 2110 | 1333 | 829 | 465 | 241 |
| 7 | 584 | 2119 | 1076 | 658 | 377 | 203 |
| 8 | 567 | 2214 | 1312 | 829 | 432 | 185 |
| 9 | 570 | 2238 | 1265 | 798 | 449 | 232 |
| 10 | 562 | 2192 | 1227 | 775 | 455 | 251 |
| 11 | 578 | 2081 | 1087 | 691 | 432 | 253 |
| 12 | 624 | 2578 | 1182 | 763 | 497 | 304 |
| 13 | 624 | 2646 | 1195 | 786 | 528 | 335 |
| 14 | 620 | 2549 | 1097 | 746 | 534 | 358 |
| 15 | 614 | 2425 | 1110 | 746 | 525 | 345 |
| 16 | 586 | 2376 | 1236 | 811 | 509 | 305 |
| 17 | 622 | 2537 | 1238 | 780 | 440 | 215 |
| 18 | 588 | 2666 | 1459 | 926 | 520 | 247 |
| 19 | 642 | 2494 | 1118 | 716 | 437 | 238 |
| 20 | 593 | 2628 | 1349 | 856 | 500 | 271 |
| 21 | 644 | 2327 | 1033 | 688 | 460 | 265 |
| 22 | 601 | 2659 | 1312 | 850 | 545 | 332 |
| 23 | 538 | 1520 | 932 | 661 | 486 | 307 |
| 24 | 593 | 2379 | 1117 | 770 | 561 | 397 |
| 25 | 566 | 2122 | 1248 | 776 | 400 | 175 |
| 26 | 590 | 2369 | 1275 | 768 | 450 | 250 |
| 27 | 648 | 2157 | 956 | 614 | 384 | 208 |
| 28 | 489 | 1557 | 1109 | 710 | 429 | 219 |
| 29 | 623 | 1674 | 765 | 493 | 300 | 164 |
| 30 | 511 | 1828 | 1203 | 754 | 420 | 196 |
| 31 | 566 | 1806 | 979 | 607 | 343 | 164 |
| 32 | 506 | 2365 | 1652 | 1056 | 547 | 229 |
| 33 | 454 | 2106 | 1744 | 1122 | 586 | 240 |
| 34 | 603 | 2457 | 1267 | 769 | 264 | 162 |
| 35 | 592 | 2121 | 1108 | 687 | 368 | 166 |
| 36 | 562 | 2010 | 1127 | 691 | 367 | 165 |
| 37 | 649 | 1692 | 697 | 437 | 255 | 127 |
| 38 | 525 | 1794 | 1116 | 694 | 387 | 182 |
| 39 | 535 | 1942 | 1186 | 739 | 411 | 195 |
| 40 | 691 | 1516 | 412 | 291 | 205 | 125 |
| 41 | 584 | 1649 | 685 | 467 | 322 | 185 |
| 42 | 669 | 2480 | 1039 | 627 | 331 | 161 |
| 43 | 600 | 2389 | 1147 | 715 | 427 | 251 |
| 44 | 626 | 2315 | 1024 | 637 | 391 | 233 |

TABLE IV

| Example No. | Dynamic Properties | | |
|---|---|---|---|
| | M' (psi) | M'' (psi) | Tan Delta |
| 1 | 1070 | 188 | 0.176 |
| 2 | 920 | 107 | 0.116 |
| 3 | 975 | 112 | 0.115 |
| 4 | 1034 | 109 | 0.105 |
| 5 | 823 | 85 | 0.108 |
| 6 | 928 | 87 | 0.093 |
| 7 | 788 | 86 | 0.109 |
| 8 | 1055 | 179 | 0.170 |
| 9 | 920 | 115 | 0.124 |
| 10 | 880 | 97 | 0.110 |
| 11 | 902 | 94 | 0.105 |
| 12 | 904 | 103 | 0.114 |
| 13 | 824 | 78 | 0.092 |
| 14 | 811 | 54.5 | 0.067 |
| 15 | 854 | 783 | 0.092 |
| 16 | 951 | 108 | 0.114 |
| 17 | 967 | 112 | 0.116 |
| 18 | 905 | 88 | 0.097 |
| 19 | 913 | 101 | 0.111 |
| 20 | 911 | 78 | 0.086 |
| 21 | 851 | 93 | 0.110 |
| 22 | 979 | 90 | 0.092 |
| 23 | 863 | 102 | 0.118 |
| 24 | 1027 | 81 | 0.079 |
| 25 | 1049 | 176 | 0.168 |
| 26 | 933 | 109 | 0.116 |
| 27 | 845 | 118 | 0.140 |
| 28 | 774 | 76 | 0.098 |
| 29 | 746 | 95 | 0.127 |
| 30 | 797 | 77 | 0.096 |
| 31 | 723 | 82 | 0.114 |
| 32 | 1111 | 159 | 0.143 |
| 33 | 1001 | 146 | 0.134 |
| 34 | 782 | 101 | 0.129 |
| 35 | 725 | 89 | 0.122 |
| 36 | 749 | 76 | 0.102 |
| 37 | 632 | 67 | 0.106 |
| 38 | 705 | 55 | 0.078 |
| 39 | 732 | 52 | 0.071 |
| 40 | 512 | 40 | 0.079 |
| 41 | 599 | 27 | 0.095 |
| 42 | 847 | 123 | 0.145 |
| 43 | 805 | 77 | 0.095 |
| 44 | 794 | 82 | 0.104 |

TABLE V

| Example No. | Tear Resistance Die C (ppi) | Shore A Hardness | Rebound D (%) | Flex Fatigue (Cycles ÷ 100) |
|---|---|---|---|---|
| 1 | 287 | 51 | 44 | 757 |
| 2 | 238 | 53 | 55 | 865 |
| 3 | 243 | 53 | 54 | 791 |
| 4 | 212 | 57 | 55 | 387 |
| 5 | 210 | 51 | 55 | 851 |
| 6 | 238 | 53 | 56 | 762 |
| 7 | 226 | 49 | 55 | 774 |
| 8 | 374 | 50 | 47 | 772 |
| 9 | 239 | 51 | 50 | 762 |
| 10 | 255 | 52 | 53 | 865 |
| 11 | 192 | 51 | 55 | 865 |
| 12 | 236 | 52 | 54 | 846 |
| 13 | 236 | 53 | 58 | 781 |
| 14 | 246 | 55 | 62 | 214 |
| 15 | 212 | 55 | 59 | 816 |
| 16 | 327 | 46 | 49 | 743 |
| 17 | 288 | 48 | 48 | 860 |
| 18 | 239 | 50 | 53 | 822 |
| 19 | 211 | 47 | 50 | 860 |
| 20 | 226 | 50 | 56 | 809 |
| 21 | 186 | 45 | 50 | 851 |
| 22 | 216 | 52 | 54 | 775 |
| 23 | 196 | 45 | 51 | 860 |
| 24 | 214 | 54 | 53 | 789 |
| 25 | 260 | 50 | 42 | 723 |
| 26 | 239 | 51 | 53 | 860 |
| 27 | 192 | 48 | 48 | 718 |
| 28 | 198 | 49 | 55 | 725 |
| 29 | 201 | 46 | 48 | 768 |
| 30 | 212 | 49 | 59 | 843 |
| 31 | 206 | 45 | 51 | 1062 |
| 32 | 280 | 52 | 47 | 517 |
| 33 | 440 | 53 | 50 | 838 |
| 34 | 354 | 46 | 49 | 851 |
| 35 | 225 | 45 | 50 | 801 |
| 36 | 232 | 47 | 54 | 812 |
| 37 | 160 | 42 | 52 | 845 |
| 38 | 174 | 45 | 58 | 762 |
| 39 | 181 | 50 | 61 | 614 |
| 40 | 127 | 39 | 56 | 779 |
| 41 | 124 | 47 | 67 | — |

TABLE V-continued

| Example No. | Tear Resistance Die C (ppi) | Shore A Hardness | Rebound D (%) | Flex Fatigue (Cycles ÷ 100) |
|---|---|---|---|---|
| 42 | 226 | 47 | 50 | 760 |
| 43 | 216 | 51 | 48 | 520 |
| 44 | 210 | 50 | 57 | 601 |

Examples 2–7, in which a mixture of carbon black and talc was employed as the filler represent a series of runs wherein the values of certain properties, in particular $T_{300}$ and Tan Delta (which both are of particular importance in rubber tire compositions), were improved by comparison to their values in Example 1 in which carbon black alone was the filler. In Examples 2–7, 40 percent by weight of the carbon black employed in Example 1 was replaced by talc. As a result of the difference between the densities of talc and carbon black, 24 phr of talc was required in each of Examples 2–4 to replace 16 phr of carbon black on a volume basis, while only 16 phr of talc was required in each of Examples 5–7 to replace 16 phr of carbon black on a weight basis. In each of the series of Examples 2–4 and the series of Examples 5–7, the aforesaid properties improved as the amount of the quaternary ammonium salt employed in the process and in the resulting composition increased.

Examples 8–15 demonstrate the effects of simultaneously increasing the degree of replacement of carbon black with talc from 0 to 90 percent by volume, increasing the total amount of carbon black and talc in the process and resulting rubber compositions from 40 to 58 phr, and increasing the amount of quaternary ammonium salt employed in the process and resulting compositions from 0 to 0.54 phr.

Turning next to the series of runs represented by Examples 16–24, comparison of the values of $T_{300}$ for each of Examples 17, 19 and 21 to that for Example 16 illustrates that as portion of carbon black replaced by talc increases, the values of $T_{300}$ decrease. However, comparison of the values of $T_{300}$ for each of the pairs of runs in Examples 17–18, 19–20 and 21–22 illustrates that the addition of a quaternary ammonium salt to the talc-containing rubber compositions raises the values of $T_{300}$ to above the level of $T_{300}$ in Example 16. In Examples 23–24 where no carbon black is employed, the use of the quaternary ammonium salt in Example 24 results in a substantial improvement in the value of $T_{300}$ over that for Example 23. However, the value of $T_{300}$ for Example 24 is still substantially less than the values of $T_{300}$ in Examples 18, 20 and 22 where a mixture of carbon black and talc is employed.

In the series of runs represented by Examples 25–33, the results for Example 26 demonstrate the beneficial properties of a composition of this invention containing carbon black, talc and a quaternary ammonium salt relative to those for compositions which are otherwise identical except for the absence of a quaternary ammonium salt in Example 27 or for the absence of both talc and a quaternary ammonium salt in Example 25.

Example 29 represents a rubber composition of this invention containing a mixture of carbon black and coal, whose beneficial properties relative to those for a composition which is otherwise identical except for the absence of a quaternary ammonium salt are illustrated by comparison of Examples 28–29.

Similarly, comparison of the results of Examples 25, 30 and 31 demonstrates that a rubber composition of this invention containing calcium carbonate (1) has substantially better values of $T_{300}$ and Tan Delta relative to a composition which is otherwise identical except for the absence of a quaternary ammonium salt in Example 31 and (2) has comparable values of $T_{300}$ and Tan Delta relative to a composition which is otherwise identical except for the absence of both calcium carbonate and a quaternary ammonium salt in Example 25.

Analysis of the $T_{300}$ modulus results for Examples 16–24 with those for Examples 25, 32 and 33 illustrates that the quaternary salt is acting as a coupling agent for both the mineral and the carbon black. For example, the modulus increase of Example 24 over that of Example 23 shows that the quaternary is aiding coupling of the mineral, and the modulus increase of Example 32 or 33 (differing by level of quaternary) over Example 25 shows the quaternary is aiding coupling of the carbon black. The data show the quaternary functioning as a coupling agent for both fillers.

The results of Examples 34, 40 and 41 demonstrate that when carbon black is not used, the values of $T_{300}$ of a rubber composition containing calcium carbonate are not competitive with those of a rubber composition containing carbon black, regardless of whether or not a quaternary ammonium salt is employed. However, comparison of the results of Examples 34–41 demonstrates that the values of $T_{300}$ and Tan Delta for rubber compositions containing a mixture of carbon black and calcium carbonate are substantially better than those containing only calcium carbonate and, depending on the amounts of calcium carbonate and, in addition, quaternary ammonium salt employed, are competitive with those for rubber compositions containing only carbon black.

EXAMPLES 45–87

To illustrate the preferred method and natural rubber compositions of the invention, rubber formulations according to the ASTM-NR formulation but containing varying amounts of clay and a quaternary salt were made and vulcanized. The compositions also varied from the ASTM-NR by the addition of 1 phr plasticizer to aid processing in laboratory equipment. The starting batch in each of Examples 45–87 contained 100 parts natural rubber, 50 parts ASTM N330 carbon black, and 1 part of the plasticizer Reogen TM (manufactured by R. T. Vanderbilt). The batch was introduced into a Banbury mixer with 3 parts stearic acid, 5 parts zinc oxide and varying amounts of clay mixed with varying amounts of dimethyl ditallow ammonium chloride (Adogen 470, from Sherex), and mixing was continued for 5 minutes at a temperature below 300° F. until the clay, salt, zinc oxide and stearic acid were fully incorporated into the rubber and the mixture appeared homogeneous. The control Examples without mineral and quaternary salt were mixed similarly. The amounts of clay added were on a volume % replacement of the carbon black basis. It was therefore necessary to add additional natural rubber and Reogen to the particular Example's starting batch, from which the desired volume of carbon black had been removed, before addition of the clay to maintain 1 phr Reogen and the ASTM-NR formulation of 100 parts natural rubber. This was done by mixing the additional materials with the starting batch before addition to the Banbury.

The master batch produced in the Banbury was removed, cooled, sheeted, cut into small pieces, and returned to the Banbury. Two and one-half parts sulfur and 0.6 parts Altax, an accelerator, were added and mixed for two minutes at 200° F. The final mix was transferred to a curing mold and cured at 160° C.

The clay and Adogen 470 were premixed before addition to the Banbury by spraying a 1/1 by weight Adogen 470/isopropyl alcohol solution containing the desired weight of Adogen onto desired amount of clay, and drying overnight at 80°–90° C. The clay used was Windsor Clay from Aiken, S.C. (available from Cyprus Industrial Minerals) with a median particle size of 25.4μ and had been degritted to <½% on a 325 mesh screen. The amounts of quaternary ammonium salt and clay employed in each Example are shown in Table I.

The vulcanized products were tested by standard methods to determine their properties, as described hereinabove except that the tear rating was determined by a trouser tear test.

The rheometric and tear rating data are in TABLE VI. The tensile properties and hardness are in TABLE VII.

TABLE VI

| Example No. | 4° Salt (phr) | % CB Repl. | Tear-Rating | $T_{S2}$ (min.) | $T_c(10)$ (min.) | $T_c(90)$ (min.) |
|---|---|---|---|---|---|---|
| 45a | 0.0 | 0 | E | 2.5 | 2.65 | 10.8 |
| 46 | " | 5 | GE | 2.6 | 2.7 | 11.0 |
| 47 | " | 10 | G | 3.0 | 3.1 | 11.8 |
| 48 | " | 15 | G | 3.0 | 3.1 | 12.2 |
| 49 | " | 25 | FG | 2.7 | 2.8 | 12.2 |
| 50 | " | 50 | PF | 2.7 | 2.7 | 12.2 |
| 51 | " | 75 | P | 2.7 | 2.6 | 11.2 |
| 52 | " | 85 | P | 3.3 | 3.3 | 11.9 |
| 53 | " | 90 | P | 3.1 | 3.0 | 11.8 |
| 54 | " | 100 | P | 3.7 | 3.7 | 11.8 |
| 55a | 0 | 0 | G | 2.65 | 2.75 | 11.8 |
| 56 | 0.2 | 0 | GE | 1.6 | 2.0 | 7.5 |
| 57 | " | 5 | G | 2.0 | 2.1 | 7.6 |
| 58 | " | 10 | G | 2.0 | 2.1 | 7.9 |
| 59 | " | 15 | G | 1.9 | 2.0 | 7.6 |
| 60 | " | 25 | GE | 2.1 | 2.2 | 8.0 |
| 61 | " | 50 | GE | 2.3 | 2.4 | 9.5 |
| 62 | " | 75 | P | 2.8 | 2.8 | 9.6 |
| 63 | " | 85 | P | 3.4 | 3.4 | 11.9 |
| 64 | " | 90 | P | 3.7 | 3.6 | 12.1 |
| 65 | " | 100 | P | 4.8 | 4.3 | 17.1 |
| 66a | 0 | 0 | GE | 2.7 | 2.8 | 11.5 |
| 67 | 0.4 | 0 | GE | 1.7 | 1.8 | 6.3 |
| 68 | " | 5 | G | 1.6 | 1.8 | 6.2 |
| 69 | " | 10 | G | 1.8 | 1.9 | 6.2 |
| 70 | " | 15 | G | 1.8 | 1.9 | 6.4 |
| 71 | " | 25 | G | 1.8 | 1.9 | 6.3 |
| 72 | " | 50 | FG | 2.0 | 2.1 | 6.9 |
| 73 | " | 75 | P | 2.3 | 2.3 | 7.4 |
| 74 | " | 85 | P | 2.5 | 2.5 | 8.0 |
| 75 | " | 90 | P | 2.6 | 2.5 | 7.9 |
| 76 | " | 100 | P | 2.9 | 2.8 | 8.7 |
| 77a | 0 | 0 | G | 2.6 | 2.7 | 11.6 |
| 78 | 0.6 | 0 | GE | 1.5 | 1.6 | 5.9 |
| 79 | " | 5 | E | 1.5 | 1.6 | 6.0 |
| 80 | " | 10 | G | 1.5 | 1.6 | 5.8 |
| 81 | " | 15 | G | 1.6 | 1.7 | 5.8 |
| 82 | " | 25 | G | 1.6 | 1.7 | 5.9 |
| 83 | " | 50 | G | 1.7 | 1.8 | 5.9 |
| 84 | " | 75 | F | 1.9 | 2.0 | 6.3 |
| 85 | " | 85 | P | 2.0 | 2.2 | 6.4 |
| 86 | " | 90 | P | 2.0 | 2.2 | 6.4 |
| 87 | " | 100 | P | 2.5 | 2.5 | 6.9 | aAverage of two samples.
E = Excellent
GE = Good to Excellent
G = Good
FG = Fair to Good
F = Fair
FP = Fair to Poor
P = Poor

TABLE VII

| Example No. | % CB Repl. | $E_u$ (%) | $T_u$ (psi) | $T_{300}$ (psi) | Shore A Hardness |
|---|---|---|---|---|---|
| 45a | 0 | 460 | 2952 | 1662 | 65 |
| 46 | 5 | 469 | 2934 | 1551 | 63 |
| 47 | 10 | 466 | 2842 | 1492 | 62 |
| 48 | 15 | 490 | 2905 | 1426 | 60 |
| 49 | 25 | 506 | 3009 | 1355 | 59 |
| 50 | 50 | 526 | 3304 | 1336 | 56 |
| 51 | 75 | 551 | 3570 | 1290 | 55 |
| 52 | 85 | 534 | 3551 | 1271 | 54 |
| 53 | 90 | 513 | 3212 | 1268 | 54 |
| 54 | 100 | 513 | 3172 | 1161 | 53 |
| 55a | 0 | 438 | 2908 | 1803 | 65 |
| 56 | 0 | 439 | 3185 | 2001 | 66 |
| 57 | 5 | 462 | 3187 | 1839 | 65 |
| 58 | 10 | 453 | 3139 | 1820 | 65 |
| 59 | 15 | 476 | 3180 | 1684 | 64 |
| 60 | 25 | 487 | 3237 | 1618 | 62 |
| 61 | 50 | 524 | 3556 | 1520 | 56 |
| 62 | 75 | 544 | 3560 | 1310 | 55 |
| 63 | 85 | 527 | 3090 | 1161 | 53 |
| 64 | 90 | 512 | 2964 | 1149 | 52 |
| 65 | 100 | 507 | 2574 | 1028 | 50 |
| 66a | 0 | 472 | 3313 | 1892 | 67 |
| 67 | 0 | 448 | 3696 | 2308 | 70 |
| 68 | 5 | 429 | 3328 | 2173 | 68 |
| 69 | 10 | 462 | 3709 | 2144 | 67 |
| 70 | 15 | 472 | 3680 | 2050 | 67 |
| 71 | 25 | 496 | 3713 | 1836 | 65 |
| 72 | 50 | 546 | 3703 | 1481 | 62 |
| 73 | 75 | 541 | 3632 | 1357 | 57 |
| 74 | 85 | 524 | 3532 | 1389 | 57 |
| 75 | 90 | 535 | 3484 | 1292 | 56 |
| 76 | 100 | 555 | 3406 | 1132 | 56 |
| 77a | 0 | 415 | 2790 | 1844 | 55 |
| 78 | 0 | 408 | 3412 | 2463 | 65 |
| 79 | 5 | 393 | 3328 | 2397 | 65 |
| 80 | 10 | 406 | 3272 | 2225 | 70 |
| 81 | 15 | 417 | 3513 | 2335 | 70 |
| 82 | 25 | 432 | 3376 | 2039 | 70 |
| 83 | 50 | 499 | 3698 | 1694 | 70 |
| 84 | 75 | 546 | 3901 | 1442 | 67 |
| 85 | 85 | 520 | 3662 | 1422 | 64 |
| 86 | 90 | 555 | 3754 | 1242 | 60 |
| 87 | 100 | 545 | 3787 | 1355 | 60 | aAverage of two samples

Examples 45–54 are without any quaternary salt and show the ultimate tensile strength, $T_u$, is comparable to or higher than the carbon black control Ex. 45 for all % levels of kaolin replacement. The % elongation generally increased with kaolin concentration. However, modulus showed a continuing decrease with higher levels of replacement.

Examples 55–65 add 0.2 phr quaternary salt to the same tests as in 45–54, with Example 55 a control without clay or salt and Example 56 a control without clay but with salt. Note that ultimate tensile strength is comparable to or higher than Example 55 or 56 up to about 90 vol. % clay. Significantly the $T_{300}$ modulus was greater or equal to that of Example 55 up to about 15 vol. % clay.

Examples 66–87 are the same as Examples 55–65 with higher quaternary salt levels—0.4 phr in Examples 66–76 and 0.6 phr in Examples 77–87. The controls are Examples 66 and 77 (no kaolin or quaternary) and Examples 67 and 78 (no kaolin, but with quaternary). Note the tensile strength which was equal to or greater than the control throughout the range of clay added. At these higher levels of quaternary, the $T_{300}$ remained higher than the controls Examples 66 and 77 up to 25–50% clay added.

The trouser tear data indicate 0.2 and 0.4 phr quaternary gave acceptable ratings up to 50 vol. % clay. With 0.6 phr, acceptable ratings were up to 85 vol. % clay.

The rheometer data show scorch safety (infered from $T_{S2}$) generally increased with increased Windsor clay levels regardless of quaternary level, but generally decreased with increasing quaternary. The optimum $T_{90}$ cure time behaved similarly.

Significantly, in all three series, 55–65, 66–76, and 77–87, the highest increase in $T_{300}$ over the control was seen in those Examples without clay but with quaternary—see Examples 56, 67 and 78. These surprising results indicate the synergism or interaction between the carbon black and quaternary salt, and that the quaternary is functioning as a coupling agent. The invention takes advantage of the coupling abilities of the quaternary.

EXAMPLES 88–93

Examples 88–93 illustrate the properties of natural rubber vulcanizates comprising carbon black and varying amounts of quaternary salt but without clay, and are used for comparison to the clay systems and to show the effect on tensile properties of different levels of the quaternary salt. The procedure used was as in Examples 45–87 except no clay was added with the quaternary salt. The rubber formulation was again the ASTM-NR varied only by addition of 1 phr Reogen. The amounts of Adogen 470 added, and tensile, rheometric and trouser tear properties of the $T_{90}$ cured vulcanizates are shown in Tables VIII and IX.

TABLE VIII

| Example | phr Adogen | $T_u$ (psi) | $T_{300}$ (psi) | $E_u$ (%) |
|---|---|---|---|---|
| 88 | 0.0 | 2805 | 1846 | 416 |
| 89 | 0.1 | 2988 | 2016 | 411 |
| 90 | 0.3 | 3314 | 2244 | 422 |
| 91 | 0.6 | 3538 | 2510 | 412 |
| 92 | 0.8 | 3456 | 2525 | 397 |
| 93 | 1.0 | 3430 | 2557 | 390 |

TABLE IX

| Example | phr Adogen | $T_{S2}$ (min) | $T_{90}$ (min) | Maximum tear (ppi) | Tear Rating |
|---|---|---|---|---|---|
| 88 | 0.0 | 2.5 | 11.6 | 31.0 | F-G |
| 89 | 0.1 | 2.2 | 8.8 | 26.6 | F-G |
| 90 | 0.3 | 1.8 | 6.6 | 19.8 | G |
| 91 | 0.6 | 1.5 | 5.7 | 20.6 | G-E |
| 92 | 0.8 | 1.3 | 5.3 | 26.3 | G-E |
| 93 | 1.0 | 1.2 | 5.0 | 21.9 | G-E |

Examples 88–93 first show the beneficial effect on $T_{300}$ modulus for carbon black filled natural rubber which increased substantially with quaternary concentration up to 0.6 phr over that of control No. 88. From 0.6 to 1.0 phr, the $T_{300}$ was relatively constant. In a similar manner, the ultimate tensile strength also increased up to 0.6 phr quaternary and remained relatively constant above 0.6 phr. As in usually observed with rubber compositions, the ultimate elongation decreased as $T_{300}$ increased. These results show the responsiveness of natural rubber to a quaternary salt additive.

Comparing Example 88 to Examples 77–87, all at 0.6 phr Adogen, the $T_{300}$ modulus at all clay levels is less than in Example 88. However, up to about 40% clay, the $T_{300}$ with 0.6 phr quaternary is above that of the carbon black control Example 77. It is also very significant and also unexpected that Examples 77–87 show *increasing* ultimate elongation at higher levels. This property of clay, carbon black and quaternary natural rubber compositions is considered a very significant property for tire formulations.

EXAMPLES 94–105

Examples 94–105 are for comparison of natural rubber compositions to similar styrene butadiene rubber compositions. The ASTM-SBR formulation of 100 parts SBR, 50 parts N330 carbon black, 1 part stearic acid, 3 parts zinc oxide, 1.75 parts sulfur, and 1 part Santocure NS (from Monsanto) was used. The mixing procedure was as set out for Examples 45–87 except that only additional SBR, and no Reogen, was added to the examples which contained clay to maintain the ASTM-SBR formula. Adogen 470 at a level of 0.6 phr and varying amounts of the above Windsor Clay were used. Table X shows the volume % clay used, $T_{300}$ modulus, $E_u$, and $T_u$. Examples 94 and 95 are duplicate controls without clay or quaternary.

TABLE X

| Example | Vol. % Replacement | $T_u$ (psi) | 300 % Modulus (psi) | $E_u$ (%) |
|---|---|---|---|---|
| 94 | 0 | 3818 | 2413 | 420 |
| 95 | 0 | 3766 | 2462 | 411 |
| 96 | 0 | 3859 | 2822 | 380 |
| 97 | 5 | 4053 | 2558 | 420 |
| 98 | 10 | 4015 | 2449 | 431 |
| 99 | 15 | 3719 | 2228 | 433 |
| 100 | 25 | 3810 | 1943 | 463 |
| 101 | 50 | 3708 | 1193 | 544 |
| 102 | 75 | 3187 | 672 | 604 |
| 103 | 85 | 3202 | 567 | 635 |
| 104 | 90 | 3071 | 532 | 641 |
| 105 | 100 | 1952 | 462 | 629 |

FIGS. 1 and 2 are plots of $T_{300}$ modulus versus Vol. % of clay for Examples 77–87 and Examples 94–105 respectively, and more easily illustrate the increased effectiveness of a quaternary ammonium salt in the preferred natural rubber compared to styrene-butadiene rubber. The Figures show that the increment of modulus increase in natural rubber from the quaternary salt is about three to three and one half times the increase in SBR. Furthermore, at 0.6 phr quaternary, $T_{300}$ equivalent to or higher than the control can only be maintained in SBR up to about 9% clay replacement, but in natural rubber can be maintained up to about 40% clay. The Figures illustrate the unobvious effect of quaternary salts on $T_{300}$ modulus in natural and styrene-butadiene rubber and the much greater effect of a quaternary salt in natural rubber.

EXAMPLES 106–114

Examples 106–114 are tests of a natural rubber composition containing Windsor clay and 1.9 wt. % of the clay Adogen 470. The 1.9 wt % quaternary was chosen because it is calculated to be an amount sufficient to maintain $T_{300}$ constant over a broad range of volume % clay. It was calculated as follows.

Using the data from Examples 1-43, a plot was made of highest vol. % of clay which had a vulcanizate $T_{300}$ modulus equal to that of the appropriate carbon black control (without Adogen) versus phr Adogen used. A best fit straight line was then drawn through the plotted points and the origin point (0. vol. %, 0 phr Adogen). The line goes throught the origin because for each increase in clay, which is less reinforcing than carbon black and decreases $T_{300}$—see Examples 45-54, an amount of Adogen appropriate to maintain $T_{300}$ constant must also be added. In other words, the loss in modulus from the less reinforcing clay is offset by the quaternary salt's effect. From the slope of the plotted line, the concentration of quaternary can be calculated, and for a $T_{90}$ cure is 1.9 wt. %. Examples 106-114 were then performed as in Examples 45-87. The natural rubber, quaternary, clay, and carbon black vulcanizates were tested for rehometric and tensile properties, trouser tear, Mooney viscosity, fatigue to failure, ozone-humidity exposure and dynamic mechanical analysis. The tests results follow in TABLES XI-XV.

TABLE XI

| Example | Vol. % Repl. | Tu (psi) | $T_{300}$ (psi) | Eu (%) | $T_{S2}$ (min.) | $T_{90}$ (min.) |
|---|---|---|---|---|---|---|
| 106 | 0 | 2148 | 1567 | 377 | 2.7 | 9.6 |
| 107 | 15 | 3059 | 1724 | 457 | 2.1 | 6.8 |
| 108 | 25 | 3448 | 1811 | 477 | 1.8 | 6.1 |
| 109 | 35 | 3587 | 1946 | 461 | 1.6 | 5.6 |
| 110 | 45 | 3625 | 1714 | 496 | 1.5 | 5.3 |
| 111 | 55 | 3658 | 1775 | 487 | 1.4 | 5.0 |
| 112 | 70 | 3667 | 1660 | 498 | 1.4 | 4.9 |
| 113 | 85 | 3734 | 1475 | 523 | 1.3 | 4.6 |
| 114 | 100 | 4259 | 1397 | 550 | 1.4 | 4.5 |

TABLE XII

| Example | Vol. % Repl. | Trouser Tear Max (pps) | Trouser Tear Rating | Fatigue to Failure (No. Cycles) | Mooney Viscosity |
|---|---|---|---|---|---|
| 106 | 0 | 10.4 | GE | 157 | 19.0 |
| 107 | 15 | 28.2 | G | 99 | 19.0 |
| 108 | 25 | 20.0 | G | 84 | 23.3 |
| 109 | 35 | 32.5 | G | 75 | 21.1 |
| 110 | 45 | 20.1 | G | 62 | 24.5 |
| 111 | 55 | 21.1 | G | 52 | 27.9 |
| 112 | 70 | 7.3 | G | 40 | 26.8 |
| 113 | 85 | 5.8 | G | 50 | 31.0 |
| 114 | 100 | 4.2 | FP | 56 | 30.0 |

TABLE XIII

| Example | Vol. % Repl. | TAN DELTA @ 10 HZ | MAXIMUM TAN DELTA |
|---|---|---|---|
| 106 | 0 | .1683 | .1683 @ 10 HZ |
| 107 | 15 | .1363 | .1398 @ 50.1 HZ |
| 108 | 25 | .1149 | .1190 @ 50.1 HZ |
| 109 | 35 | .1014 | .1076 @ 63.1 HZ |
| 110 | 45 | .0935 | .0994 @ 50.1 HZ |
| 111 | 55 | .0825 | .0877 @ 63.1 HZ |
| 112 | 70 | .0705 | .0747 @ 63.1 HZ |
| 113 | 85 | .0644 | .0668 @ 63.1 HZ |
| 114 | 100 | .0484 | .0541 @ 50.1 HZ |

TABLE XIV

| Example | % Replacement (by volume) | Ozone Exposure | Compression Set (%) |
|---|---|---|---|
| 106 | 0 | 3 | 86 |
| 107 | 15 | 3 | 90 |
| 108 | 25 | 2 | 86 |
| 109 | 35 | 2 | 87 |
| 110 | 45 | 2 | 91 |
| 111 | 55 | 2 | 87 |
| 112 | 70 | 2 | 84 |
| 113 | 85 | 2 | 82 |
| 114 | 100 | 1 | 83 |

Visual Rating on 0-4 scale with 4 as most severe cracking.
Average of 2 samples tested for all replacement levels.
Exposure to 0.5 ppm ozone for 24 hours at 80° F.

TABLE XV

| Example | % Repl. (by vol.) | Ult. Tens. (psi) | Modulus $T_{100}$ | Modulus $T_{200}$ | Modulus $T_{300}$ | Elong. |
|---|---|---|---|---|---|---|
| 106 | 0 | 1150 | 481 | 1145 | — | 207 |
| 107 | 15 | 1490 | 521 | 1221 | — | 238 |
| 108 | 25 | 1772 | 565 | 1273 | — | 265 |
| 109 | 35 | 1906 | 606 | 1300 | — | 275 |
| 110 | 45 | 2053 | 569 | 1173 | 1912 | 320 |
| 111 | 55 | 2088 | 645 | 1234 | 1920 | 310 |
| 112 | 70 | 2198 | 759 | 1377 | — | 298 |
| 113 | 85 | 2451 | 739 | 1205 | 1928 | 358 |
| 114 | 100 | 2610 | 712 | 1024 | 1574 | 413 |

HUMIDITY TESTING[a]

[a]Exposure to 95% relative humidity at 82° C. for 7 days.

FIG. 3 is a plot of the $T_{300}$ modulus versus vol. % clay. The plot shows that up to about 80% clay, the $T_{300}$ modulus remains at least equal to $T_{300}$ of the carbon black control No. 106.

Examples 106-114 also show the preferred amount of up to about 40 vol. % clay. First, up to 40% replacement, the ultimate tensile strength, tensile modulus, ultimate elongation, humidity resistance, loss tangent and rebound of the vulcanizates all exceed these properties of the purely black filled control No. 106. Second, the trouser tear, hardness, Mooney viscosity, fatigue resistance, ozone exposure and compression set all are equivalent to control 106.

These Examples illustrate the preferred embodiment that a rubber made by mechanically mixing in a rubber substantially comprising natural rubber (1) carbon black, (2) a reinforcing mineral of kaolin or metakaolin, and (3) a coupling agent consisting of a quaternary ammonium salt, has improved properties compared to pure black filled rubbers. The combination filler of carbon black, clay, and quaternary shows a high degree of rubber reinforcement at significant levels of clay. In addition, these rubbers are cost effective because of clay's much lower cost compared to the carbon black it replaces.

EXAMPLES 115-123

Examples 115-123 are tests of a styrene-butadiene rubber composition containing Windsor clay and 8.6 wt. % of the clay Adogen 470. The 8.6 wt. % quaternary was calculated to be an amount sufficient to maintain $T_{300}$ constant over a broad range of volume % clay, and was calculated in the same manner as in Examples 106-114. Examples 115-123 were then performed as in Examples 45-87. The volume % clay was varied from 0 to 18%. The styrene butadiene, quaternary, clay, and carbon black vulcanizates were tested for rheometric and tensile properties, trouser tear, Mooney viscosity, fatigue to failure, and dynamic mechanical analysis. The tests results follow in TABLES XVI–XVII.

TABLE XVI

| Example | Vol. % Repl. | $T_u$ (psi) | $T_{300}$ (psi) | $E_u$ (%) | $T_{s2}$ (min.) | $T_{90}$ (min.) |
|---|---|---|---|---|---|---|
| 115 | 0 | 3910 | 2405 | 429 | 6.5 | 15.7 |
| 116 | 4 | 3999 | 2544 | 417 | 5.0 | 10.3 |
| 117 | 6 | 4130 | 2488 | 439 | 4.2 | 8.6 |
| 118 | 8 | 4002 | 2560 | 420 | 3.9 | 8.1 |
| 119 | 10 | 3927 | 2422 | 424 | 3.9 | 8.1 |
| 120 | 12 | 3627 | 2296 | 411 | 3.4 | 7.7 |
| 121 | 14 | 3770 | 2277 | 429 | 3.2 | 7.7 |
| 122 | 16 | 3745 | 2247 | 432 | 3.7 | 8.2 |
| 123 | 18 | 3783 | 2108 | 443 | 4.1 | 8.2 |

TABLE XVII

| Example | Vol. % Repl. | Trouser Tear Max. (pps) | Rating |
|---|---|---|---|
| 115 | 0 | 9.0 | G |
| 116 | 15 | 10.0 | E |
| 117 | 25 | 11.1 | E |
| 118 | 35 | 10.4 | E |
| 119 | 45 | 10.4 | E |
| 120 | 55 | 10.7 | E |
| 121 | 70 | 11.2 | E |
| 122 | 85 | 10.1 | E |
| 123 | 100 | 9.7 | E |

The tensile modulus strategy for Examples 115–123 for the $T_{90}$ cured vulcanizates are shown in TABLE XVI. As seen therein essentially equivalent modulus properties to the control Example 115 were provided up to approximately the 12 vol. % clay level. Although not shown in the Table, vulcanizates of identical composition which were cured at a $T_{max}$ showed equivalent modulus to the control 115 up to about 17 vol. % clay. The trouser tear ratings in TABLE XVII showed excellent trouser tear ratings comparable to, if not slightly better than, the control 115.

Examples 115–123 when compared to Examples 106–114 illustrate better performance for natural rubber compositions in the invention, but also show the improved properties of styrene butadiene rubber vulcanizates according to the invention. Although in natural rubber up to about 80 volume % clay can be used and maintain modulus property while in styrene butadiene only about 12 volume % clay can be used, note, however, that in styrene butadiene the quaternary ammonium salt coupling agent does permit use of significant levels of clay and also improves the trouser tear rating.

EXAMPLE 124

Example 124 shows the difference between the natural rubber compositions of this invention and the powdered rubber produced by the precipitation method of Berg, et al., U.S. Pat. No. 3,998,778. Berg's rubbers are formed by precipitation from a sodium silicate solution and contain silicate as an unavoidable ingredient. Applicant's natural rubber uses a mineral filler consisting essentially of kaolin and metakaolin.

Example I of Berg was duplicated as follows. Initially, 1000 g. of a 10 wt.% polybutadiene solution in hexane was prepared. This mixture was defined as solution A. Six grams of 50 wt. % cetyltrimethyl ammonium chloride and 5 g. of 10 wt. % sulfuric acid were added to one liter water; this mixture, defined as solution B, was stirred for about 10 minutes.

Solution A was added to solution B and emulsified utilizing an ultrasonic unit. Then, 1000 g. of a 5 wt.% aqueous suspension of N550 carbon black was added to the emulsified mixture, followed by further treatment with the ultrasonic unit.

A separate solution was prepared by adding 45 g. of a 26 wt. % sodium silicate solution to a kettle containing $4\frac{1}{2}$ liters of distilled water. The contents of the kettle were stirred and heated to 80°–90° C. at which point the emulsified carbon black/polymer mixture was added slowly. Hexane was allowed to distill off. After cooling overnite, the contents were filtered and the residue collected.

Gravimetric analysis of the product rubber showed that it contained 4.96 grams $SiO_2$, or 53% of the original 9.29 grams of silicate in the aqueous solution. Analysis of the leftover solution by atomic absorption spectroscopy for a material balance showed 4.53 grams silicate expressed as $SiO_2$, or 49%. Thus, all rubber compositions produced by the method of Berg contain about 5 phr silicate.

EXAMPLES 125–133

U.S. Pat. No. 3,627,723, Kealy, discloses use of surfactants in carbon black and mineral filled rubbers made from a co-polymer of an α-olefin and a non-conjugated diene. To illustrate the differences between Kealy's three surfactant classes in rubber compositions other than those claimed in Kealy, rubber formulations each containing only one surfactant were vulcanized and the vulcanized rubber composition properties were measured. The surfactants used included one from each of the Kealy classes, and were Siponate 330—alkyl benzene sulfonate salt (anionic); Adogen 470—dimethylditallow ammonium chloride (cationic); and Lonzest SMP—sorbitan monopalmitate (non-ionic). Table XVIII lists the formulation amounts in phr of the components in each rubber composition. The compositions in Table XVIII started with a masterbatch, called CIM 11, which was formulated in a ratio of 100 parts styrene-butadiene rubber (SBR) to 80 parts N330 carbon black. To the CIM 11 was added sufficient SBR (SBR 1502) to produce a carbon black level of 50 phr. The compositions in Table XVIII did not contain mineral filler. The stearic acid, ZIC Stick (a form of zinc oxide), sulfur and Santocure NS are conventional rubber components added for vulcanization.

The rubber mixing procedure was that all components but the sulfur and Santocure NS were mixed in a Banbury mixer at a starting temperature of about 300° F. for 5 minutes. A portion of this mixture was removed and the sulfur and Santocure NS were rolled up in the middle. This portion was then returned to the Banbury mixer and mixed for 2 minutes. The final temperatures varied depending upon the sample from 235° F. to 245° F.

TABLE XVIII

| Component | Example No. | | | |
|---|---|---|---|---|
| | 125 | 126 | 127 | 128 |
| SBR 1502 | 37.5 | 37.5 | 37.5 | 37.5 |
| CIM II | 112.5 | 112.5 | 112.5 | 112.5 |
| Stearic Acid | 1 | 1 | 1 | 1 |
| ZIC Stick | 3 | 3 | 3 | 3 |
| Adogen 470 | — | 2.31 | — | — |
| Siponate 330 | — | — | 1.5 | — |

TABLE XVIII-continued

| Component | 125 | 126 | 127 | 128 |
|---|---|---|---|---|
| Lonzest SMP | — | — | — | 1.5 |
| Sulfur | 1.75 | 1.75 | 1.75 | 1.75 |
| Santocure NS | 1 | 1 | 1 | 1 |
| phr Carbon Black | 50 | 50 | 50 | 50 |
| phr Adogen 470 | — | 1.5 | — | — |
| phr Siponate 330 | — | — | 1.5 | — |
| phr Lonzest SMP | — | — | — | 1.5 |
| St. Temp. °F. | 298 | 293 | 295 | 304 |
| Final Temp. °F. | 245 | 236 | 238 | 235 |
| $T_{90}$ Time min. | 18.2 | 14.0 | 14.0 | 19.0 |

The rubber compositions were vulcanized to a $T_{90}$ cure, and the $T_{300}$ modulus property ($M_{300}$ in Kealy), $T_S2$ cure rate and trouser tear rating were measured. Table XVIII lists the properties of the vulcanized rubbers.

TABLE XIX

| Property | 125 | 126 | 127 | 128 |
|---|---|---|---|---|
| $T_{300}$ | 3156 | 3618 | 3037 | 2856 |
| Trouser Tear Rating | Poor | Good | Fair | Fair |
| $T_S2$ Min. | 6.8 | 3.3 | 6.4 | 7.1 |

Comparing the $T_{300}$ moduli, it is readily seen that only Example 126 with the cationic surfactant, which is a quaternary ammonium salt claimed by Applicant, improved the $T_{300}$ over that of the control Example 125. From the cure rate, only the quaternary salt strongly accelerated cure rate. The quaternary salt also produced a better trouser tear rating than the other two surfactants. These superior effects and differences of cationic quaternary ammonium salts are not disclosed by Kealy since the surfactant classes are taught as equivalent with the Kealy rubber. See the $M_{300}$ modulus properties in Table V of the Kealy examples which shows virtually identical behavior.

Additional tests were made of SBR rubber compositions containing the different surfactants, carbon black and clay at 15 vol. % replacement of carbon black. Rubbers filled with clay were selected and tested since the Kealy examples all used clay/carbon black filler mixtures. These tests were run with a different starting masterbatch (SBR 1601) containing 100 parts SBR and 50 parts N330 black. The clay used was the above Windsor clay. Table XX lists the formulation details with Example 129 the control sample without mineral or surfactant and Example 130 the control sample without surfactant but with mineral. The mixing procedure was the same as above except that the sulfur and Santocure NS were mixed into the small portion on a small mill, and the final mix period was only 1 minute.

TABLE XX

| Component | 129 | 130 | 131 | 132 | 133 |
|---|---|---|---|---|---|
| SBR 1502 | — | 15 | 15 | 15 | 15 |
| SBR 1601 | 150 | 127.5 | 127.5 | 127.5 | 127.5 |
| Stearic Acid | 1 | 1 | 1 | 1 | 1 |
| ZIC Stick | 3 | 3 | 3 | 3 | 3 |
| Clay | — | 11.0 | 11.0 | 11.0 | 11.0 |
| Adogen 470 | — | — | 2.31 | — | — |
| Lonzest SMP | — | — | — | — | 1.5 |
| Siponate 330 | — | — | — | 1.5 | — |
| Sulfur | 1.75 | 1.75 | 1.75 | 1.75 | 1.75 |
| Santocure NS | 1 | 1 | 1 | 1 | 1 |
| N330 | 50 | 42.5 | 42.5 | 42.5 | 42.5 |
| % Replacement | — | 15 | 15 | 15 | 15 |
| phr Adogen | — | — | 1.5 | — | — |
| phr Siponate 330 | — | — | — | 1.5 | — |
| phr Lonzest SMP | — | — | — | — | 1.5 |
| St. Temp. °F. | 300 | 300 | 300 | 295 | 300 |
| Final Temp. °F. | 240 | 252 | 256 | 262 | 270 |
| $T_{90}$ Cure min. | 16.0 | 15.2 | 8.7 | 13.6 | 15.8 |

Table XXI lists the $T_{300}$, $T_S2$ cure rate and the trouser tear rating of each sample.

TABLE XXI

| Property | 129 | 130 | 131 | 132 | 133 |
|---|---|---|---|---|---|
| $T_{300}$ | 2340 | 1860 | 2197 | 1946 | 1765 |
| Trouser Tear | Good | Good | Good | Good | Good |
| $T_S2$ min. | 6.5 | 5.6 | 2.9 | 6.2 | 6.7 |

These results show that the quaternary ammonium salt provided substantially greater $T_{300}$ modulus than the control No. 130. The other surfactant classes of Kealy provided less modulus improvement (No. 132) over the control No. 130 or worse modulus (No. 133) than the control No. 130. The quaternary salt again strongly accelerated cure rate while the others had much less effect on the cure rate. The trouser tear ratings were all the same.

The above tests show the unobvious and superior effects of a quaternary salt when used in filled rubbers different than in Kealy, since in contrast, the modulus properties in the Kealy examples show little variation between his three classes of surfactant. Although these examples used styrene butadiene rubber, similar results are believed to occur if the other two surfactant classes were tested in natural rubber. The basis of this belief is that both anionic and nonionic were ineffective in SBR while the quaternary does improve modulus significantly, although not as much as in natural rubber. Thus, even if the anionic and nonionic are effective in natural rubber, their effect would be much less the quaternary effect.

From the above description it is apparent that while only certain embodiments have been set forth, alternative embodiments and various modifications will be apparent from the above description to those skilled in the art. These and other alternatives are considered equivalents and within the spirit and scope of the present invention.

Having described the invention, what is claimed is:
1. A method of compounding rubber comprising mechanically mixing and substantially uniformly dispersing the following materials in natural rubber, polyisoprene rubber, styrene-butadiene rubber, or polybutadiene rubber:
   A. 1. particulate agent G selected from the group consisting of kaolin, metakaolin, talc, pyrophyllite, metal carbonate, coal, and coke and having a median particle size in the range of from about 0.01 to about 20 microns,
   A. 2. particulate carbon black having a median particle size in the range of from about 0.001 to about 20 microns, and
   A. 3. a coupling agent consisting essentially of quaternary ammonium salt at a level of from about 0.005 to about 15 phr; or B. 1. a particulate adduct of Agent G and a coupling agent consisting essentially of the quaternary ammonium salt, having a median particle size in the range of from about 0.01 to about 20 microns and present at a level such that the portion thereof contributed from the quaternary ammonium salt is at a level of from about 0.005 to about 15 phr, and B. 2. the particulate carbon black; or C. 1. a particulate adduct of the particulate carbon black and a coupling agent consisting essentially of the quaternary ammonium salt, having a median particle size in the range of from about 0.001 to about 20 microns and present at a level such that the portion thereof contributed from the quaternary ammonium salt is at a level of from about 0.005 to about 15 phr, and C. 2. particulate Agent G; or D. 1. a particulate adduct of Agent G and a coupling agent consisting essentially of the quaternary ammonium salt having a median particle size in the range of from about 0.01 to about 20 microns and present at level such that the portion thereof contributed from the quaternary ammonium salt is at a level of from about 0.005 to about 15 phr, and D. 2. a particulate adduct of the carbon black and a coupling agent consisting essentially of the quaternary ammonium salt having a median particle size in the range of from about 0.001 to about 20 microns and present at a level such that the portion thereof contributed from the quaternary ammonium salt is at a level of from about 0.005 to about 15 phr;

wherein the combined contents of (1) Agent G or the portion of the aforesaid adduct contributed from Agent G and (2) the carbon black or the portion of the aforesaid adduct contributed from the carbon black are in the range of from about 5 to about 400 phr and the weight ratio of (1) Agent G or the portion of the aforesaid adduct contributed from Agent G -to- (2) the carbon black or the portion of the aforesaid adduct contributed from the carbon black is in the range of from about 1:19 to about 9:1.

2. The method of claim 1 wherein the rubber substantially comprises natural rubber.

3. The method of claim 2 wherein natural rubber comprises at least about 30% of the rubber.

4. The method of claim 1 wherein Agent G comprises kaolin.

5. The method of claim 4 wherein the amount of kaolin comprises about 5 to 40 volume % of the carbon black.

6. The method of claim 1 wherein the median particle size of Agent G and of the adduct containing Agent G is in the range of from about 0.1 to about 5 microns.

7. The method of claim 1 wherein the median particle size of the carbon black and of the adduct containing the carbon black is in the range of from about 0.001 to about 1 micron.

8. The method of claim 1 wherein the combined contents of (1) Agent G or the portion of the adduct contributed from Agent G and (2) the carbon black or the portion of the adduct contributed from the carbon black are in the range of from about 40 to about 200 phr.

9. The method of claim 1 wherein the weight ratio of (1) Agent G or the portion of the adduct contributed from Agent G -to- (2) the carbon black or the portion of the adduct contributed from the carbon black is in the range of from about 1:19 to about 1:1.

10. The method of claim 1 wherein the quaternary ammonium salt and the portion of each of the adducts contributed from the quaternary ammonium salt are each at a level of from about 0.10 to about 1.5 phr.

11. The method of claim 1 wherein the quaternary ammonium salt has a structure of formula I, II, III, IV or V:

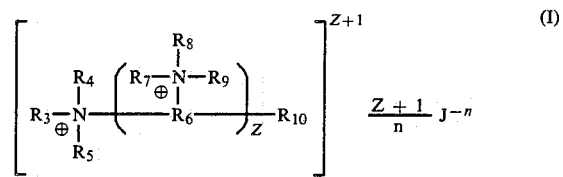 (I)

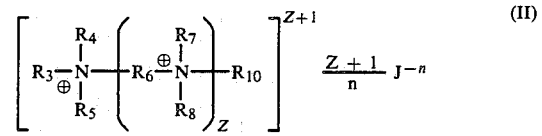 (II)

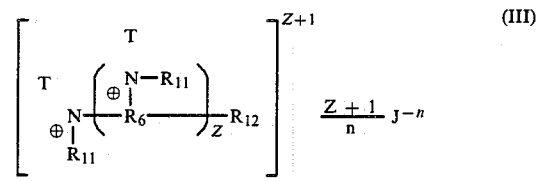 (III)

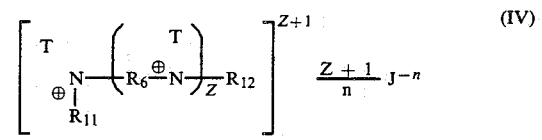 (IV)

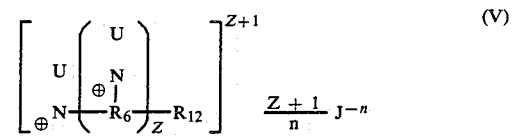 (V)

wherein Z is zero or a positive integer from 1 to 100, J is an anionic radical, n is the absolute value of the oxidation state of J, and $R_6$ is an alkylenyl radical containing from 2 to 20 carbon atoms or an aryl radical containing from 6 to 14 carbon atoms, wherein formulas I and II, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; aliphatic radicals containing a total of from 8 to 40 carbon atoms which are saturated or unsaturated and unsubstituted or substituted with at least one hydroxy, alkoxy or polyalkoxy group; aryl radicals containing from 6 to 18 carbon atoms; and saturated and unsaturated araliphatic radicals containing a total of from 7 to 48 carbon atoms, wherein formulas I and II, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom, wherein formulas I and II, (1) at least one of $R_3$, $R_4$, $R_5$, $R_7$, $R_8$, $R_9$ and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms, or (b) at least two of $R_3$, $R_4$, $R_5$, $R_7$, $R_8$, $R_9$ and $R_{10}$ are aliphatic radicals containing at least 8 carbon atoms, wherein formulas III, IV and V, each of T and U is a radical which, in conjunction with each nitrogen atom to which it is shown attached in formula III, IV or V, forms a heterocyclic radical containing at least one nitrogen atom in the ring system and containing only nitrogen and carbon atoms in the ring system, and the T and U portions of the ring system are unsubstituted or substituted by at least one alkyl group with the total number of ring substituents on each of T and U being from 1 to 32 carbon atoms, wherein formulas III and IV, $R_{11}$ is selected from the group consisting of the groups described by $R_3$, $R_4$, $R_5$, $R_7$, $R_8$ and $R_9$ and alkylamidoalkyl or alkylesteralkyl groups containing a total of at least 14 carbon atoms, and wherein formulas III, IV and V, when Z is zero, $R_{12}$ is selected from the group consisting of the groups described by $R_{11}$, and when Z is a positive integer, $R_{12}$ is selected from the group consisting of the groups described by $R_{11}$ and a hydrogen atom.

12. The method of claim 11 wherein in each of formulas I, II, III, IV and V, at least one of $R_3$, $R_4$, $R_5$, $R_7$, $R_8$, $R_9$, $R_{10}$, $R_{11}$ and $R_{12}$ is a methyl radical.

13. The method of claim 11 wherein in each of formulas I, II, III, IV and V, at least one of $R_3$, $R_4$, $R_5$, $R_7$, $R_8$, $R_9$, $R_{10}$, $R_{11}$ and $R_{12}$ is an aliphatic radical containing from 12 to 22 carbon atoms.

14. The method of claim 11 wherein, in each of formulas I, II, III, IV and V, at least one of $R_3$, $R_4$, $R_5$, $R_7$, $R_8$, $R_9$, $R_{10}$, $R_{11}$ and $R_{12}$ is an aliphatic radical containing a polyalkoxy radical containing from 2 to 15 repeating ethoxy radical units.

15. The method of claim 11 wherein in each of formulas I, II, III, IV and V, at least one of $R_3$, $R_4$, $R_5$, $R_7$, $R_8$, $R_9$, $R_{10}$, $R_{11}$ and $R_{12}$ is an araliphatic radical containing from 7 to 22 carbon atoms.

16. The method of claim 11 wherein $R_6$ is an alkylenyl radical containing from 2 to 6 carbon atoms.

17. The method of claim 11 wherein each of T and U is a radical in conjunction with the nitrogen atom to which it is shown attached in formula III, IV or V forms a quaternary ammonium salt selected from the group consisting of pyrrolidinium, pyrrolium, pyrrolinium, imidazolium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinazolinium, quinoxalinium, naphthyridinium, quinolizinium, carbazolium, acridinium, phenazinium, phenanthridinium, phenanthrolinium, benzoisoquinolinium, purinium, porphinium, and pteridinium, the heterocyclic rings being unsubstituted or substituted by at least one alkyl group, and the quaternary ammonium salts formed by partial or complete hydrogenation of the heterocyclic rings of any of the aforesaid quaternary ammonium salts.

18. The method of claim 11 wherein Z is zero or a positive integer from 1 to 5.

19. The method of claim 11 wherein Z is zero or 1.

20. The rubber composition formed by the method of claim 1.

21. A rubber composition comprising a substantially uniform dispersion of the following materials in natural rubber, polyisoprene rubber, styrene-butadiene rubber or polybutadiene rubber:

A. 1. particulate Agent G selected from the group consisting of kaolin, metakaolin, talc, pyrophyllite metal carbonate, coal, and coke and having a median particle size in the range of from about 0.01 to about 20 microns, A. 2. particulate carbon black having a median particle size in the range of from about 0.001 to about 20 microns, and A. 3. a coupling agent consisting essentially of a quaternary ammonium salt at a level of from about 0.005 to about 15 phr; or B. 1. a particulate adduct of Agent G and a coupling agent consisting essentially of the quaternary ammonium salt having a median particle size in the range of from about 0.01 to about 20 microns and present at a level such that the portion thereof contributed from the quaternary ammonium salt is at a level of from about 0.005 to about 15 phr, and B. 2. the particulate carbon black; or C. 1. a particulate adduct of the particulate carbon black and a coupling agent consisting essentially of the quaternary ammonium salt, having a median particle size in the range of from about 0.001 to about 20 microns and present at a level such that the portion thereof contributed from the quaternary ammonium salt is at a level of from about 0.005 to about 15 phr, and C. 2. particulate Agent G; or D. 1. a particulate adduct of Agent G and a coupling agent consisting essentially of the quaternary ammonium salt, having a median particle size in the range of from about 0.01 to about 20 microns and present at level such that the portion thereof contributed from the quaternary ammonium salt is at a level of from about 0.005 to about 15 phr, and D. 2. a particulate adduct of the carbon black and a coupling agent consisting essentially of the quaternary ammonium salt, having a median particle size in the range of from about 0.001 to about 20 microns and present at a level such that the portion thereof contributed from the quaternary ammonium salt is at a level of from about 0.005 to about 15 phr; or E. B, C or D above wherein the particulate adduct in B or C or at least one of the particulate adducts in D is also an adduct with the rubber;

wherein the combined contents of (1) Agent G or the portion of the aforesaid adduct contributed from Agent G and (2) the carbon black or the portion of the aforesaid adduct contributed from the carbon black are in the range of from about 5 to about 400 phr and the weight ratio of (1) Agent G or the portion of the aforesaid adduct contributed from Agent G -to- (2) the carbon black or the portion of the aforesaid adduct contributed from the carbon black is in the range of from about 1:19 to about 9:1.

22. The composition of claim 21 wherein the rubber substantially comprises natural rubber.

23. The composition of claim 21 wherein Agent G comprises kaolin.

24. The composition of claim 23 wherein the amount of kaolin is about 5 to about 40 volume % of the carbon black.

25. The composition of claim 21 wherein the median particle size of the carbon black and of the adduct containing the carbon black is in the range of from about 0.01 to about 1 micron.

26. The composition of claim 21 wherein the combined contents of (1) Agent G or the portion of the adduct contributed from Agent G and (2) the carbon black or the portion of the adduct contributed from the carbon black are in the range of from about 30 to about 120 phr.

27. The composition of claim 21 wherein the weight ratio of (1) Agent G or the portion of the adduct contributed from Agent G -to- (2) the carbon black or the portion of the adduct contributed from the carbon black is in the range of from about 1:19 to about 1:1.

28. The composition of claim 21 wherein the quaternary ammonium salt and the portion of each of the adducts contributed from the quaternary ammonium salt are each at a level of from about 0.10 to about 1.5 phr.

29. The composition of claim 21 wherein the quaternary ammonium salt has a structure of formula I, II, III, IV or V:

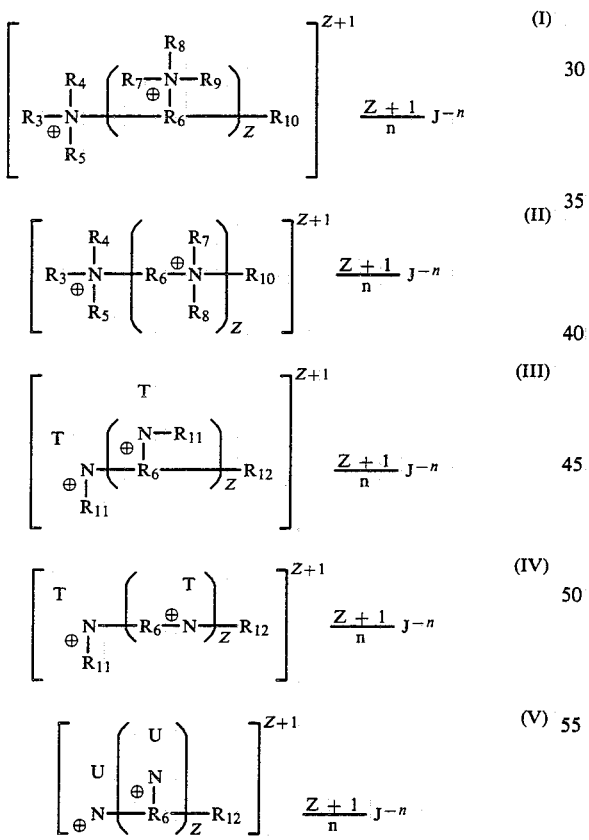

wherein Z is zero or a positive integer from 1 to 100, J is an anionic radical, n is the absolute value of the oxidation state of J, and $R_6$ is an alkylenyl radical containing from 2 to 20 carbon atoms or an aryl radical containing from 6 to 14 carbon atoms, wherein formulas I and II, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; aliphatic radicals containing a total of from 8 to 40 atoms which are saturated or unsaturated and unsubstituted or substituted with at least one hydroxy, alkoxy or polyalkoxy group; aryl radicals containing from 6 to 18 carbon atoms; and saturated and unsaturated araliphatic radicals containing a total of from 7 to 48 carbon atoms, wherein formulas I and II, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom, wherein formulas I and II, (1) at least one of $R_3$, $R_4$, $R_5$, $R_7$, $R_8$, $R_9$ and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms, or (b) at least two of $R_3$, $R_4$, $R_5$, $R_7$, $R_8$, $R_9$ and $R_{10}$ are aliphatic radicals containing at least 8 carbon atoms, wherein formulas III, IV and V, each of T and U is a radical which, in conjunction with each nitrogen atom to which it is shown attached in formula III, IV or V, forms a heterocyclic radical containing at least one nitrogen atoms in the ring system and containing only nitrogen and carbon atoms in the ring system, and the T and U portions of the ring system are unsubstituted or substituted by at least one alkyl group with the total number of ring substituents on each of T and U being from 1 to 32 carbon atoms, wherein formulas III and IV, $R_{11}$ is selected from the group consisting of the groups described by $R_3$, $R_4$, $R_5$, $R_7$, $R_8$ and $R_9$ and alkylamidoalkyl or alkylesteralkyl groups containing a total of at least 14 carbon atoms, and wherein formulas III, IV and V, when Z is zero, $R_{12}$ is selected from the group consisting of the groups described by $R_{11}$, and when Z is a positive integer, $R_{12}$ is selected from the group consisting of the groups described by $R_{11}$ and a hydrogen atom.

30. The composition of claim 29 wherein in each of formulas I, II, III, IV and V, at least one of $R_3$, $R_4$, $R_5$, $R_7$, $R_8$, $R_9$, $R_{10}$, $R_{11}$ and $R_{12}$ is a methyl radical.

31. The composition of claim 29 wherein in each of formulas I, II, III, IV and V, at least one of $R_3$, $R_4$, $R_5$, $R_7$, $R_8$, $R_9$, $R_{10}$, $R_{11}$ and $R_{12}$ is an aliphatic radical containing from 12 to 22 carbon atoms.

32. The composition of claim 29 wherein, in each of formulas I, II, III, IV and V, at least one of $R_3$, $R_4$, $R_5$, $R_7$, $R_8$, $R_9$, $R_{10}$, $R_{11}$ and $R_{12}$ is an aliphatic radical containing a polyalkoxy radical containing from 2 to 15 repeating ethoxy radical units.

33. The composition of claim 29 wherein in each of formulas I, II, III, IV and V, at least one of $R_3$, $R_4$, $R_5$, $R_7$, $R_8$, $R_9$, $R_{10}$, $R_{11}$ and $R_{12}$ is an araliphatic radical containing from 7 to 22 carbon atoms.

34. The composition of claim 29 wherein $R_6$ is an alkylenyl radical containing from 2 to 6 carbon atoms.

35. The composition of claim 29 wherein each of T and U is a radical in conjunction with the nitrogen atom to which it is shown attached in formula III, IV or V forms a quaternary ammonium salt selected from the group consisting of pyrrolidinium, pyrrolium, pyrrolinium, imidazolium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinalizinium, quinoxalinium, naphthyridinium, quinolizinium, carbazolium, acridinium, phenazinium, phenanthridinium, phenanthrolinium, benzoisoquinolinium, purinium, porphinium, and pteridinium, the heterocyclic rings being unsubstituted or substituted by at least one alkyl group, and the quaternary ammonium salts formed by partial or complete hydrogenation of the heterocyclic rings of any of the aforesaid quaternary ammonium salts.

36. The composition of claim 29 wherein Z is zero or a positive integer from 1 to 5.

37. The method of claim 36 wherein Z is zero or 1.

* * * * *